United States Patent
Stilp

(10) Patent No.: US 7,091,827 B2
(45) Date of Patent: Aug. 15, 2006

(54) COMMUNICATIONS CONTROL IN A SECURITY SYSTEM

(75) Inventor: Louis A. Stilp, Berwyn, PA (US)

(73) Assignee: InGrid, Inc., Berwyn, PA (US)

(*) Notice: Subject to any disclaimer, the term of this patent is extended or adjusted under 35 U.S.C. 154(b) by 433 days.

(21) Appl. No.: 10/366,320

(22) Filed: Feb. 14, 2003

(65) Prior Publication Data

US 2004/0160309 A1 Aug. 19, 2004

Related U.S. Application Data

(63) Continuation-in-part of application No. 10/356,512, filed on Feb. 3, 2003, now Pat. No. 6,888,459.

(51) Int. Cl.
*G08B 13/14* (2006.01)

(52) U.S. Cl. .................... 340/10.1; 340/10.2; 340/505; 340/539.1; 340/541

(58) Field of Classification Search ............... 340/10.2, 340/5.61, 10.1, 539.1, 505, 541
See application file for complete search history.

(56) References Cited

U.S. PATENT DOCUMENTS

| | | | |
|---|---|---|---|
| 4,367,458 A | 1/1983 | Hackett | |
| 4,465,904 A | 8/1984 | Gottsegen et al. | |
| 4,550,311 A | 10/1985 | Galloway et al. | |
| 4,613,848 A | 9/1986 | Watkins | |
| 4,724,425 A | 2/1988 | Gerhart et al. | |
| 4,731,810 A | 3/1988 | Watkins | |
| 4,754,261 A | 6/1988 | Marino | |
| 4,772,876 A | 9/1988 | Laud | |
| 4,812,820 A | 3/1989 | Chatwin | |
| 4,855,713 A | 8/1989 | Brunius | |
| 4,908,604 A | 3/1990 | Jacob | |
| 4,951,029 A | 8/1990 | Severson | |
| 4,980,913 A | 12/1990 | Skret | |
| 5,040,335 A | 8/1991 | Grimes | |
| 5,233,640 A | 8/1993 | Kostusiak | |
| 5,235,326 A * | 8/1993 | Beigel et al. | 340/10.41 |
| 5,300,875 A | 4/1994 | Tuttle | |
| 5,307,763 A | 5/1994 | Arthur et al. | |
| 5,347,280 A * | 9/1994 | Schuermann | 342/42 |
| 5,400,246 A | 3/1995 | Wilson et al. | |
| 5,406,263 A | 4/1995 | Tuttle | |
| 5,438,607 A | 8/1995 | Przygoda, Jr. et al. | |
| 5,465,081 A | 11/1995 | Todd | |
| 5,477,215 A * | 12/1995 | Mandelbaum | 340/5.61 |
| 5,500,651 A * | 3/1996 | Schuermann | 342/42 |

(Continued)

FOREIGN PATENT DOCUMENTS

GB 2 330 230 A 4/1999

*Primary Examiner*—Edwin C. Holloway, III
(74) *Attorney, Agent, or Firm*—Stradley Ronon Stevens & Young, LLP

(57) ABSTRACT

A system and method for controlling communications in a security system based upon RFID techniques. The RFID reader of the security system can be provided with multiple modulation techniques, multiple antennas, and the capability to vary its power level and carrier frequency. The controller of the security system determines which RFID readers may transmit, at what times, and the parameters with which to transmit. The RFID transponders of the security system limit their transmissions to responses only, and only when information to transmit exists. The controller may vary the parameters used by the RFID reader based upon the RFID transponder that is being addressed. The RFID reader can detect interference or jamming, and respond.

47 Claims, 18 Drawing Sheets

U.S. PATENT DOCUMENTS

| | | | |
|---|---|---|---|
| 5,508,692 A | 4/1996 | Wolfram |
| 5,543,778 A | 8/1996 | Stouffer |
| 5,568,535 A | 10/1996 | Sheffer et al. |
| 5,583,796 A | 12/1996 | Reese |
| 5,621,380 A | 4/1997 | Mutoh et al. |
| 5,621,662 A | 4/1997 | Humphries et al. |
| 5,625,338 A | 4/1997 | Pildner et al. |
| 5,629,981 A | 5/1997 | Nerlikar |
| 5,646,592 A | 7/1997 | Tuttle |
| 5,649,296 A | 7/1997 | MacLellan et al. |
| 5,668,929 A | 9/1997 | Foster, Jr. |
| 5,706,399 A | 1/1998 | Bareis |
| 5,726,644 A | 3/1998 | Jednacz et al. |
| 5,736,927 A | 4/1998 | Stebbins et al. |
| 5,742,237 A | 4/1998 | Bledsoe |
| 5,745,849 A | 4/1998 | Britton |
| 5,748,079 A | 5/1998 | Addy |
| 5,761,206 A | 6/1998 | Kackman |
| 5,774,876 A | 6/1998 | Woolley et al. |
| 5,786,767 A | 7/1998 | Severino |
| 5,799,062 A | 8/1998 | Lazzara et al. |
| 5,801,626 A | 9/1998 | Addy |
| 5,802,467 A | 9/1998 | Salazar et al. |
| 5,805,063 A | 9/1998 | Kackman |
| 5,805,064 A | 9/1998 | Yorkey |
| 5,809,013 A | 9/1998 | Kackman |
| 5,812,054 A | 9/1998 | Cohen |
| 5,822,373 A | 10/1998 | Addy |
| 5,828,300 A | 10/1998 | Addy et al. |
| 5,831,531 A | 11/1998 | Tuttle |
| 5,887,176 A | 3/1999 | Griffith et al. |
| 5,889,468 A | 3/1999 | Banga |
| 5,894,266 A | 4/1999 | Wood, Jr. et al. |
| 5,898,369 A | 4/1999 | Godwin |
| 5,905,438 A | 5/1999 | Weiss et al. |
| 5,907,279 A | 5/1999 | Bruins et al. |
| 5,920,270 A | 7/1999 | Peterson |
| 5,929,778 A | 7/1999 | Asama et al. |
| 5,937,067 A | 8/1999 | Thatcher et al. |
| 5,949,335 A | 9/1999 | Maynard |
| 5,950,110 A | 9/1999 | Hendrickson |
| 5,952,935 A * | 9/1999 | Mejia et al. ............... 340/10.3 |
| 6,026,165 A | 2/2000 | Marino et al. |
| 6,028,513 A | 2/2000 | Addy |
| 6,034,603 A * | 3/2000 | Steeves .................... 340/10.2 |
| 6,049,273 A | 4/2000 | Hess |
| 6,054,925 A | 4/2000 | Proctor et al. |
| 6,058,137 A | 5/2000 | Partyka |
| 6,058,374 A | 5/2000 | Guthrie et al. |
| 6,060,994 A | 5/2000 | Chen |
| 6,078,269 A | 6/2000 | Markwell et al. |
| 6,084,530 A | 7/2000 | Pidwerbetsky et al. |
| 6,087,933 A | 7/2000 | Addy et al. |
| 6,091,320 A | 7/2000 | Odinak |
| 6,104,785 A | 8/2000 | Chen |
| 6,120,262 A | 9/2000 | McDonough et al. |
| 6,127,928 A | 10/2000 | Issacman et al. |
| 6,134,303 A | 10/2000 | Chen |
| 6,137,402 A | 10/2000 | Marino |
| 6,150,936 A | 11/2000 | Addy |
| 6,150,948 A | 11/2000 | Watkins |
| 6,160,488 A | 12/2000 | Honda |
| 6,163,257 A | 12/2000 | Tracy |
| 6,175,860 B1 | 1/2001 | Gaucher |
| 6,177,861 B1 | 1/2001 | MacLellan et al. |
| 6,191,701 B1 | 2/2001 | Bruwer |
| 6,195,006 B1 | 2/2001 | Bowers et al. |
| 6,204,760 B1 | 3/2001 | Brunius |
| 6,208,247 B1 | 3/2001 | Agre et al. |
| 6,208,694 B1 | 3/2001 | Addy |
| 6,215,404 B1 | 4/2001 | Morales |
| 6,229,997 B1 | 5/2001 | Addy |
| 6,236,315 B1 | 5/2001 | Helms |
| 6,243,010 B1 | 6/2001 | Addy et al. |
| 6,243,012 B1 | 6/2001 | Shober et al. |
| 6,252,501 B1 | 6/2001 | Tice et al. |
| 6,255,944 B1 | 7/2001 | Addy |
| 6,271,754 B1 | 8/2001 | Durtler |
| 6,285,261 B1 | 9/2001 | Pax et al. |
| 6,294,992 B1 | 9/2001 | Addy et al. |
| 6,313,743 B1 | 11/2001 | Abraham-Fuchs et al. |
| 6,317,028 B1 | 11/2001 | Valiulis |
| 6,366,215 B1 | 4/2002 | Tice et al. |
| 6,367,697 B1 | 4/2002 | Turner et al. |
| 6,377,609 B1 | 4/2002 | Brennan, Jr. |
| 6,441,723 B1 | 8/2002 | Mansfield, Jr. et al. |
| 6,441,731 B1 | 8/2002 | Hess |
| 6,445,291 B1 | 9/2002 | Addy et al. |
| 6,445,292 B1 | 9/2002 | Jen et al. |
| 6,456,668 B1 | 9/2002 | MacLellan et al. |
| 6,459,726 B1 | 10/2002 | Ovard et al. |
| 6,466,138 B1 | 10/2002 | Partyka |
| 6,483,433 B1 | 11/2002 | Moskowitz et al. |
| 6,496,475 B1 | 12/2002 | Ji et al. |
| 6,501,807 B1 | 12/2002 | Chieu et al. |
| 6,507,607 B1 | 1/2003 | Hill |
| 6,593,845 B1 | 7/2003 | Friedman et al. |
| 6,597,956 B1 | 7/2003 | Aziz et al. |
| 6,608,551 B1 * | 8/2003 | Anderson et al. ......... 340/10.51 |
| 6,617,963 B1 | 9/2003 | Watters et al. |
| 6,624,750 B1 | 9/2003 | Marman et al. |
| 6,646,550 B1 | 11/2003 | Runyon et al. |
| 6,691,172 B1 | 2/2004 | Clow et al. |
| 6,693,513 B1 | 2/2004 | Tuttle |
| 6,693,999 B1 | 2/2004 | Ito et al. |
| 6,703,930 B1 | 3/2004 | Skinner |
| 6,707,374 B1 | 3/2004 | Zaharia |
| 6,762,686 B1 | 7/2004 | Tabe |
| 6,806,808 B1 | 10/2004 | Watters et al. |
| 2001/0008390 A1 | 7/2001 | Berquist et al. |
| 2002/0060639 A1 | 5/2002 | Harman |
| 2002/0070863 A1 | 6/2002 | Brooking |
| 2002/0111698 A1 | 8/2002 | Graziano et al. |
| 2002/0174367 A1 | 11/2002 | Kimmel et al. |
| 2003/0133473 A1 | 7/2003 | Manis et al. |
| 2003/0227385 A1 | 12/2003 | Lancaster |
| 2004/0008112 A1 | 1/2004 | Carrender |
| 2004/0046642 A1 | 3/2004 | Becker et al. |
| 2004/0066280 A1 | 4/2004 | Pratt et al. |
| 2004/0189471 A1 | 9/2004 | Ciarcia et al. |
| 2004/0210495 A1 | 10/2004 | White |

* cited by examiner

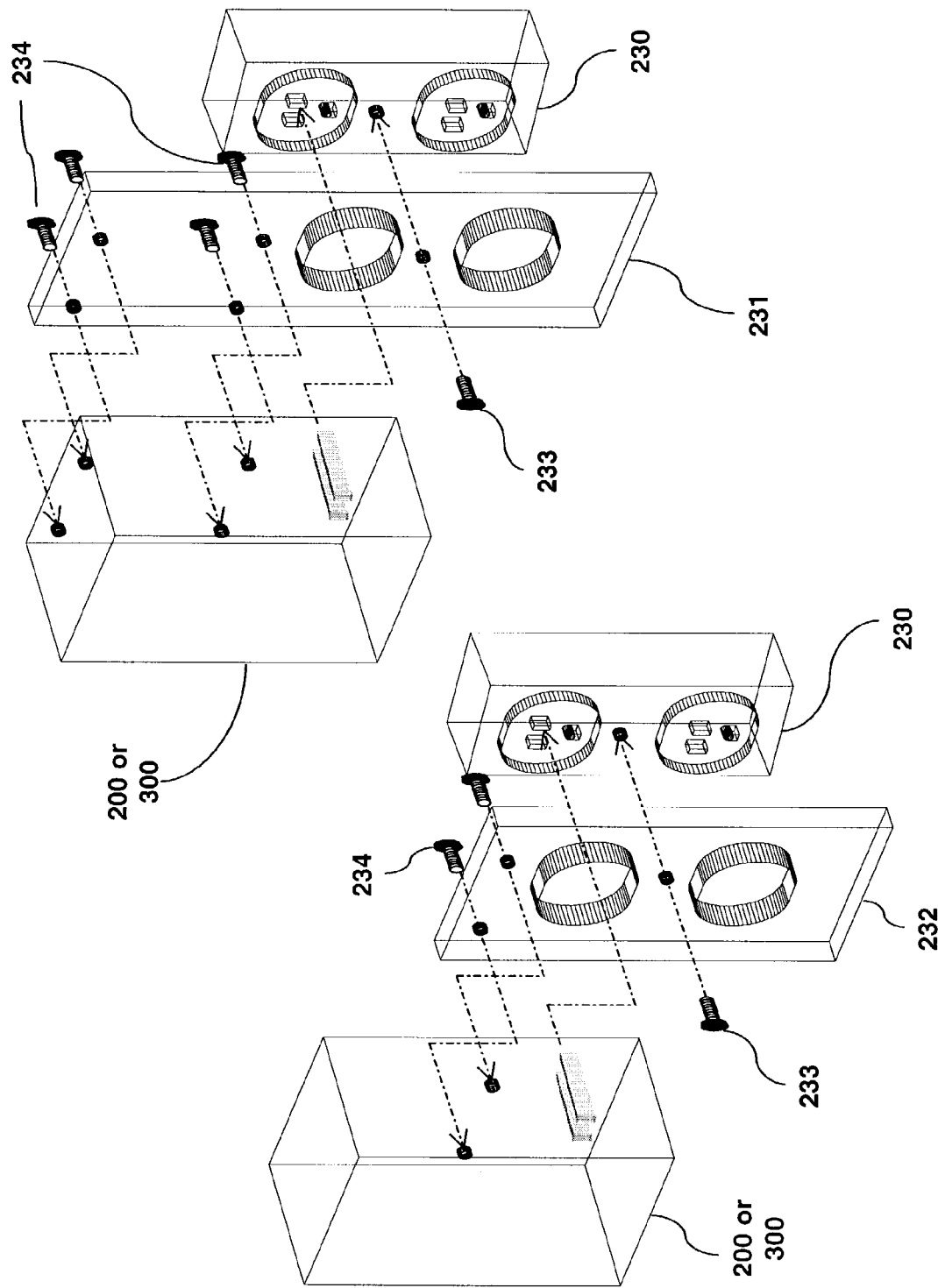

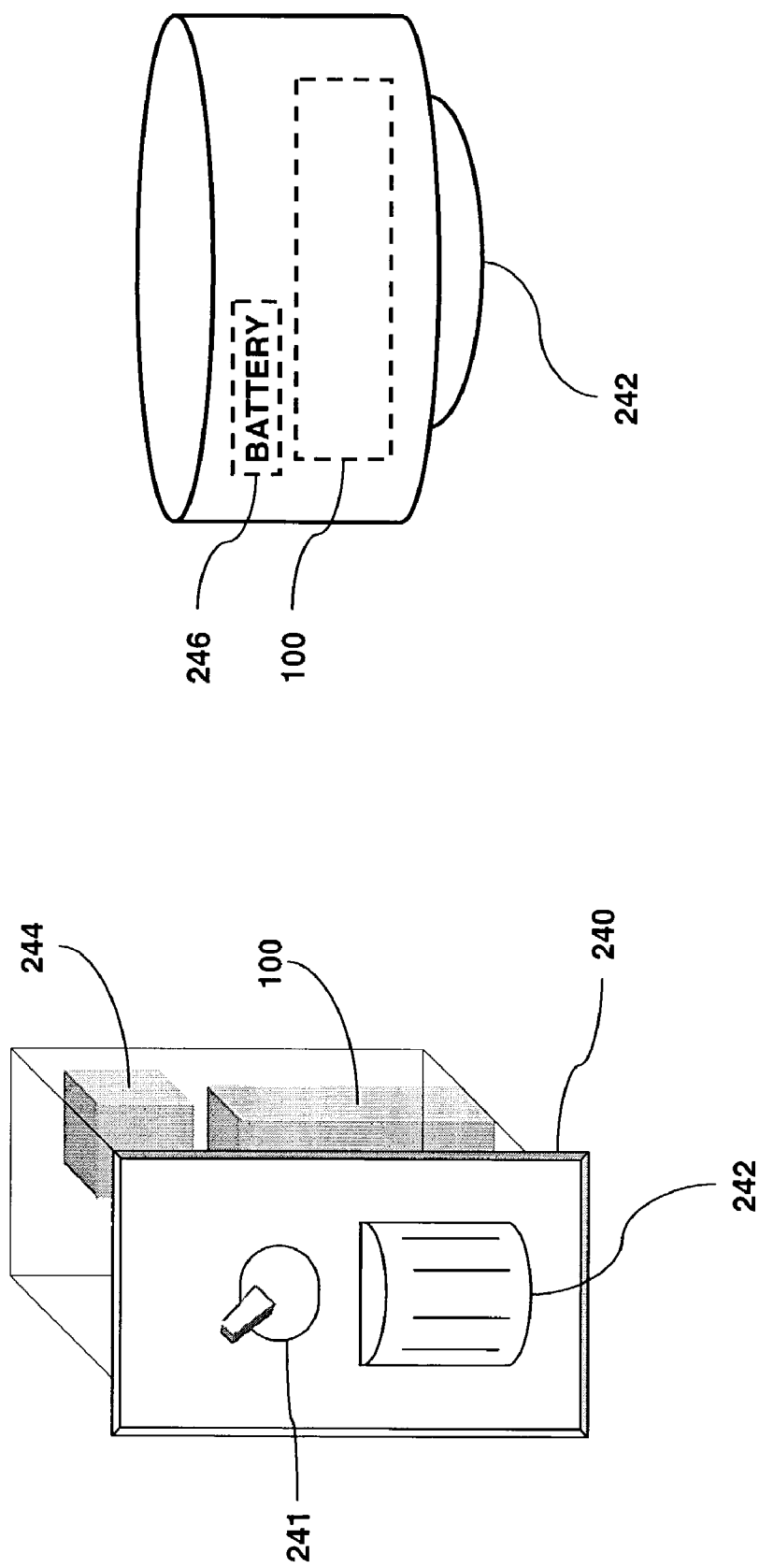

COMMUNICATIONS CONTROL IN A SECURITY SYSTEM

CROSS REFERENCE TO RELATED APPLICATIONS

This patent application is a continuation-in-part of U.S. application Ser. No. 10/356,512, filed on Feb. 3, 2003, titled "RFID Based Security System," by the inventor of the present application (the parent application has been issued as U.S. Pat. No. 6,888,459). This patent application is further cross referenced to the other following patent applications, filed even date herewith by the inventor of the present application: "Device Enrollment in a Security System," U.S. application Ser. No. 10/366,335; "Controller for a Security System," U.S. application Ser. No. 10/366,334 (now allowed); "RFID Transponder for a Security System," U.S. application Ser. No. 10/366,317; and "RFID Reader for a Security System," U.S. application Ser. No. 10/366,316.

This patent application is further cross referenced to the following patent applications: U.S. application Ser. No. 10/423,887, "RFID Based Security Network," filed on Apr. 28, 2003 (now allowed); U.S. application Ser. No. 10/602,854, "RFID Reader for a Security Network," filed on Jun. 25, 2003 (now allowed); U.S. application Ser. No. 10/795,368, "Multi-Controller Security Network," filed on Mar. 9, 2004; U.S. application Ser. No. 10/806,371, "Communications Architecture for a Security Network," filed on Mar. 23, 2004; U.S. application Ser. No. 10/820,804, "Configuration Program for a Security System," filed on Apr. 9, 2004; and U.S. application Ser. No. 10/821,938, "Cordless Telephone System," filed on Apr. 12, 2004.

TECHNICAL FIELD

The present invention relates generally to security systems and, more particularly, to controlling the communications among the RFID components of such a security system.

BACKGROUND OF THE INVENTION

Security systems are described in numerous patents, and have been in prevalent use for over 40 years. In the United States, there are over 14 million security systems in residential homes alone. The vast majority of these systems are hardwired systems, meaning the keypad, system controller, and various intrusion sensors are wired to each other. These systems are easy to install when a home is first being constructed and access to the interiors of walls is easy; however, the cost increases substantially when wires must be added to an existing home. On average, the security industry charges approximately $75 per opening (i.e., window or door) to install a wired intrusion sensor (such as a magnet and reed switch). For this reason, most homeowners only monitor a small portion of their openings. In order to induce a homeowner to install a substantial system, many security companies will underwrite a portion of the costs of installing a security system. Therefore, if the cost of installation were $1,500 (i.e., approximately 20 windows and doors), the security company may only charge $500 and then require the homeowner to sign a multi-year contract with monthly fees. The security company then recovers its investment over time.

In order to reduce the labor costs of installing wired systems into existing homes, wireless security systems have been developed in the last 10 to 20 years. These systems use RF communications for at least a portion of the keypads and intrusion sensors. Typically, a transceiver is installed in a central location in the home. Then, each opening is outfitted with an intrusion sensor connected to a small battery powered transmitter. The initial cost of the wireless system averages $40 for each transmitter, plus the cost of the centrally located transceiver. This may seem less than the cost of a wired system, but in fact the opposite is true over a longer time horizon. Wireless security systems have demonstrated lower reliability than wired systems, leading to higher service and maintenance costs. For example, each transmitter contains a battery that drains over time (perhaps only a year or two), requiring a service call to replace the battery.

Many of these transmitters lose their programming when the battery dies, requiring reprogramming along with the change of battery. Further, in larger houses, some of the windows and doors may be an extended distance from the centrally located transceiver, causing the wireless communications to intermittently fade out.

These types of wireless security systems operate under 47 CFR 15.231 (a), which places severe limits on the amount of power that can be transmitted. For example, at 433 MHz, used by the wireless transmitters of one manufacturer, a field strength of only 11 mV/m is permitted at 3 meters (equivalent to approximately 36 microwatts). At 345 MHz, used by the wireless transmitters of another manufacturer, a field strength of only 7.3 mV/m is permitted at 3 meters (equivalent to approximately 16 microwatts). Furthermore, control transmissions are only permitted once per hour, with a duration not to exceed one second. If these same transmitters wish to transmit data under 47 CFR 15.231 (e), the field strengths at 345 and 433 MHz are reduced to 2.9 and 4.4 mV/m, respectively. (In a proceeding opened in October, 2001, the FCC is soliciting comments from the industry under which some of the rules of this section may change.) The problems of using these methods of transmission are discussed in various patents, including U.S. Pat. Nos. 6,087,933, 6,137,402, 6,229,997, 6,288,639, and 6,294,992. In addition, as disclosed in U.S. Pat. No. 6,026,165, since centrally located transceivers must have a range sufficient to attempt to reach throughout the house, these transceivers can also transmit and receive signals to/from outside the house and are therefore vulnerable to hacking by sophisticated intruders. Therefore, for the foregoing reasons and others, a number of reputable security monitoring companies strongly discourage the use of wireless security systems.

In either wired or wireless prior art security systems, additional sensors, such as glass breakage sensors or motion sensors, are an additional cost beyond a system with only intrusion sensors. Each glass breakage or motion sensor can cost $50 or more, not counting the labor cost of running wires from the alarm panel to these sensors. In the case of wireless security systems, the glass breakage or motion sensor can also be wireless, but then these sensors suffer from the same drawback as the transmitters used for intrusion sensing—they are battery powered and therefore require periodic servicing to replace the batteries and reprogram in the event of memory loss.

Because existing wireless security systems are not reliable and wired security systems are difficult to install, many homeowners forego self-installation of security systems and either call professionals or do without. It is interesting to note that, based upon the rapid growth of home improvement chains such as Home Depot and Lowe's, there is a large market of do-it-yourself homeowners that will attempt carpentry, plumbing, and tile—but not security. There is, therefore, an established need for a security system that is both reliable and capable of being installed by the average homeowner.

Radio Frequency Identification, or RFID, technology has been in existence for over 40 years, with substantial development by a number of large companies. A search of the USPTO database will reveal several hundred RFID-related patents. Surprisingly, though, a number of large companies such as Micron and Motorola have exited the RFID business as the existing applications for RFID have not proved lucrative enough. Most development and applications for RFID technology have been targeted at moveable items—things, people, animals, vehicles, merchandise, etc.—that must be tracked or counted. Therefore, RFID has been applied to animal tracking, access control into buildings, inventory management, theft detection, toll collections, and library and supermarket checkout. In each of the applications, the low-cost RFID transponder or tag is affixed to the moveable object, and the RFID reader is generally a much higher cost transceiver. The term "RFID reader" or "RFID interrogator" is commonly used in the industry to refer to any transceiver device capable of transmitting to and receiving signals from RFID tags or RFID transponders. The terms "RFID tag" or "RFID transponder" are commonly used interchangeably in the industry to refer to the device remote from the RFID reader, with which the RFID reader is communicating. For example, in a building access application, an RFID reader is usually affixed near the entrance door of a building. Persons desiring access to the building carry an RFID tag or RFID transponder, sometimes in the form of an ID card, and hold this RFID tag or RFID transponder next to or in the vicinity of the RFID reader when attempting entry to the building. The RFID reader then "reads" the RFID tag, and if the RFID tag is valid, unlocks the entrance door.

The relatively high cost (hundreds to thousands of dollars) of RFID readers is due to the requirement that they perform reliably in each mobile application. For example, the RFID reader for a toll collection application must "read" all of the RFID tags on cars traveling 40 MPH or more. Similarly, access control must read a large number of RFID tags in a brief period of time (perhaps only hundreds of milliseconds) while people are entering a building. Or a portable RFID reader must read hundreds or thousands of inventory RFID tags simultaneously while the operator is walking around a warehouse. Each of these applications can be fairly demanding from a technical standpoint, hence the need for sophisticated and higher cost readers. To date, RFID technology has not been applied to the market for security systems in homes or businesses. It is therefore an object of the present invention to provide a security system for use in residential and commercial buildings that can be self-installed or installed by professionals at a much lower cost than present systems. It is a further object of the present invention to provide a combination of RFID transponders and RFID readers that can be used in a security system for buildings.

BRIEF SUMMARY OF THE INVENTION

The present invention is a highly reliable system and method for constructing a security system for a building using a novel approach to designing RFID readers and RFID transponders to provide a radio link between each of a number of openings and a controller capable of causing an alert in the event of an intrusion.

The present invention improves upon the traditional system model and paradigm by providing a security system with reliability exceeding that of existing wireless security systems, at lower cost than either professionally installed hardwired systems or wireless security systems. Furthermore, the present invention allows self-installation by typical homeowners targeted by the major home improvement chains.

Several new marketing opportunities are created for security systems that are otherwise unavailable in the market today. First, for professional systems sold by major alarm companies, a single customer service representative may sell the system to a homeowner and then install the system in a single visit to the customer's home. This is in contrast to the present model where a salesperson sells the system and then an installer must return at a later date to drill holes, pull wires, and otherwise install the system. Second, homeowners may purchase the inventive system at a home improvement chain, self-install the system, and contract for alarm monitoring from an alarm services company. The overall system cost is lower, and the alarm services company is not required to underwrite initial installation costs, as is presently done. Therefore, the alarm services company can offer monitoring services at substantially lower prices. Third, a new market for apartment dwellers opens. Presently, very few security systems are installed in apartments because building owners are unwilling to permit the drilling of holes and installation of permanent systems. Apartment dwellers are also more transient than homeowners and therefore most apartment dwellers and alarm service companies are unwilling to underwrite the cost of these systems anyway. The inventive system is not permanent, nor is drilling holes for hardwiring required. Therefore, an apartment dweller can purchase the inventive security system, use it in one apartment, and then unplug and move the system to another apartment later.

The improvements provided by the present invention are accomplished through the following innovations. The first innovation is the design of a low cost RFID reader that can be installed into an outlet and cover an area the size of a large room in the example of a house. Rather than rely on the centrally located transceiver approach of existing unreliable wireless security systems, the present invention places the RFID reader into each major room for which coverage is desired. The RFID reader has a more limited range than the centrally located transceiver, and is therefore less susceptible to hacking by sophisticated intruders. For the example of smaller to medium sized houses, a single RFID reader may be able to cover more than one room. Furthermore, the presence of multiple RFID readers within a building provides spatial receiver diversity.

The second innovation is the use of an RFID transponder for each covered opening. As is well known there is at least an order of magnitude difference in the manufacturing costs of RFID transponders versus present wireless security system transmitters. This is due both to difference in design, as well as manufacturing volumes of the respective components used in the two different designs.

The third innovation is the provision of a circuitry in both the RFID reader and the RFID transponder for the charging of any battery included in the RFID transponder. For some installations, a battery may be used in the RFID transponder to increase the range and reliability of the RF link between reader and transponder. The present problem of short battery life in wireless security system transmitters is overcome by the transfer of power through radio waves. The RFID reader receives its power from standard AC outlets, and converts some of this power into RF energy, which can then be received by the RFID transponder and used for battery charging.

The fourth innovation is the status monitoring of the need for battery charging. The RFID transponder can indicate to the RFID reader when power for charging is required. If desired, the RFID reader can shut off its transmitter if no power transfer is required, thereby reducing RF emissions and any possible interference.

The fifth innovation is the use of power line carrier communications between the RFID readers and one or more controllers. While the RFID readers can also be hardwired to a controller, a significant installation cost advantage is obtained by allowing the RFID readers to "piggyback" on the standard AC power lines already in the building. By using the power line carrier connection technique, an example homeowner can simply plug in the controller to a desired outlet, plug in the RFID readers in an outlet in the desired covered rooms, configure the system and the system is ready to begin monitoring RFID transponders.

The sixth innovation is the optional inclusion of a glass breakage or motion sensor into the RFID reader. In many applications, an RFID reader will likely be installed into each major room of a house, using the same example throughout this document. Rather than require a separate glass breakage or motion sensor as in prior art security systems, a form of the RFID reader includes a glass breakage or motion sensor within the same integrated package, providing a further reduction in overall system cost when compared to prior art systems.

The seventh innovation is the permitted use of multiple controllers in the security system. In the present invention, the controller will typically include the keypad for the security system. Therefore, a homeowner or building owner installing multiple keypads will also simultaneously be installing multiple controllers. The controllers operate in a redundant mode with each other. Therefore, if an intruder discovers and disables a single keypad, the intruder may still be detected by any of the remaining installed controllers.

The eighth innovation is the permitted optional use of either the traditional public switched telephone network (i.e., PSTN—the standard home phone line) or the integrated use of a commercial mobile radio service (CMRS) such as a TDMA, GSM, or CDMA wireless network for causing an alert at an emergency response agency such as an alarm service company. In particular, the use of a CMRS network provides a higher level of security, and a further ease of installation. The higher level of security results from (i) reduced susceptibility of the security system to cuts in the wires of a PSTN connection, and (ii) optional use of messaging between the security system and an emergency response agency such that any break in the messaging will in itself cause an alert.

Additional objects and advantages of this invention will be apparent from the following detailed description.

BRIEF DESCRIPTION OF THE DRAWINGS

FIGS. 11A and 11B show one way in which the controller or RFID reader may be mounted to a plate, and then mounted to an outlet.

FIGS. 16A and 16B show alternate forms of a passive infrared sensor that may be used with the security system.

DETAILED DESCRIPTION OF THE INVENTION

The present invention is a highly reliable system and method for constructing a security system for use in a building, such as a commercial building, single or multi-family residence, or apartment. The security system may also be used for buildings that are smaller structures such as sheds, boathouses, other storage facilities, and the like.

Figure 1:
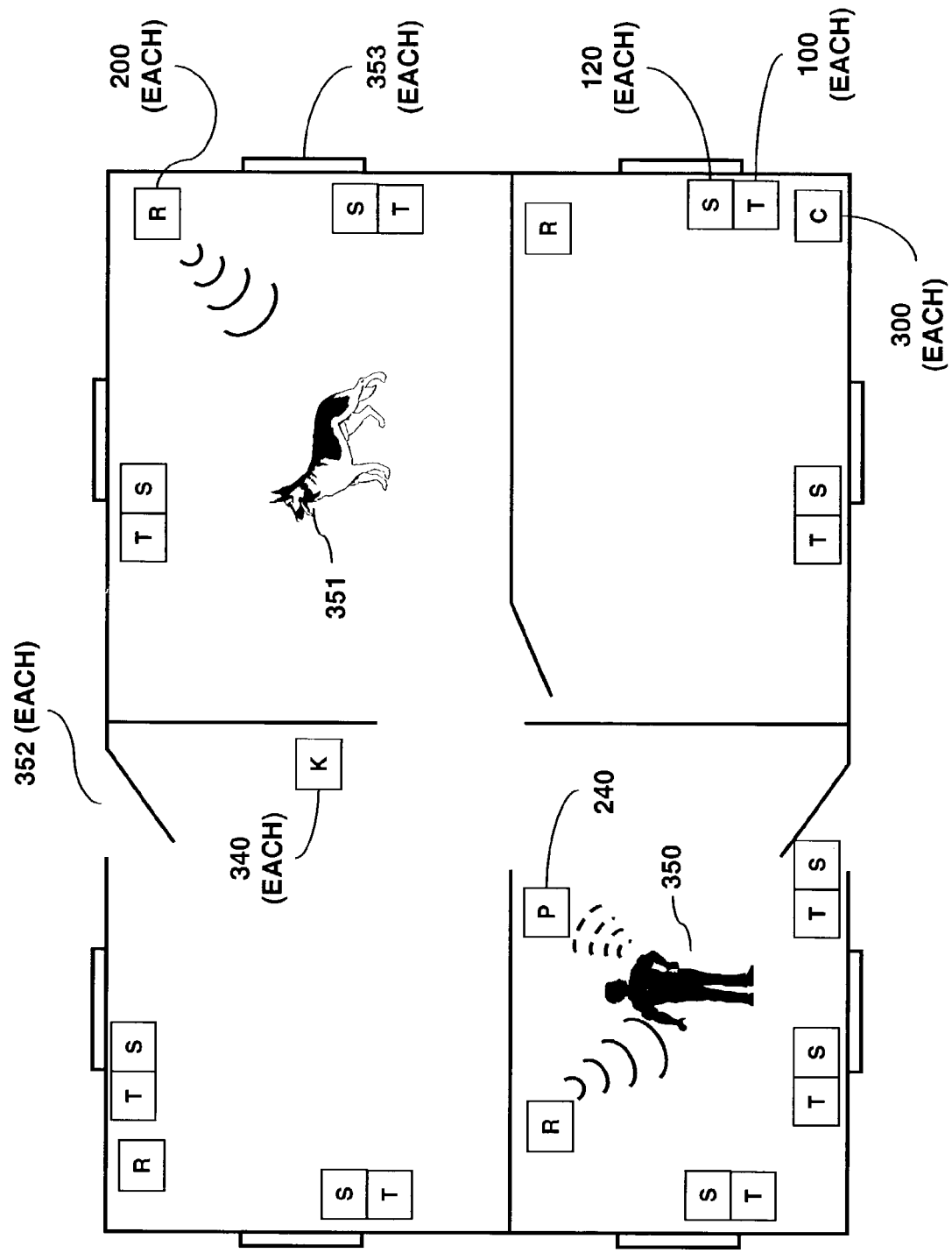
FIG. 1 shows the distributed manner in which the present invention would be installed into an example house.
Figure 2:
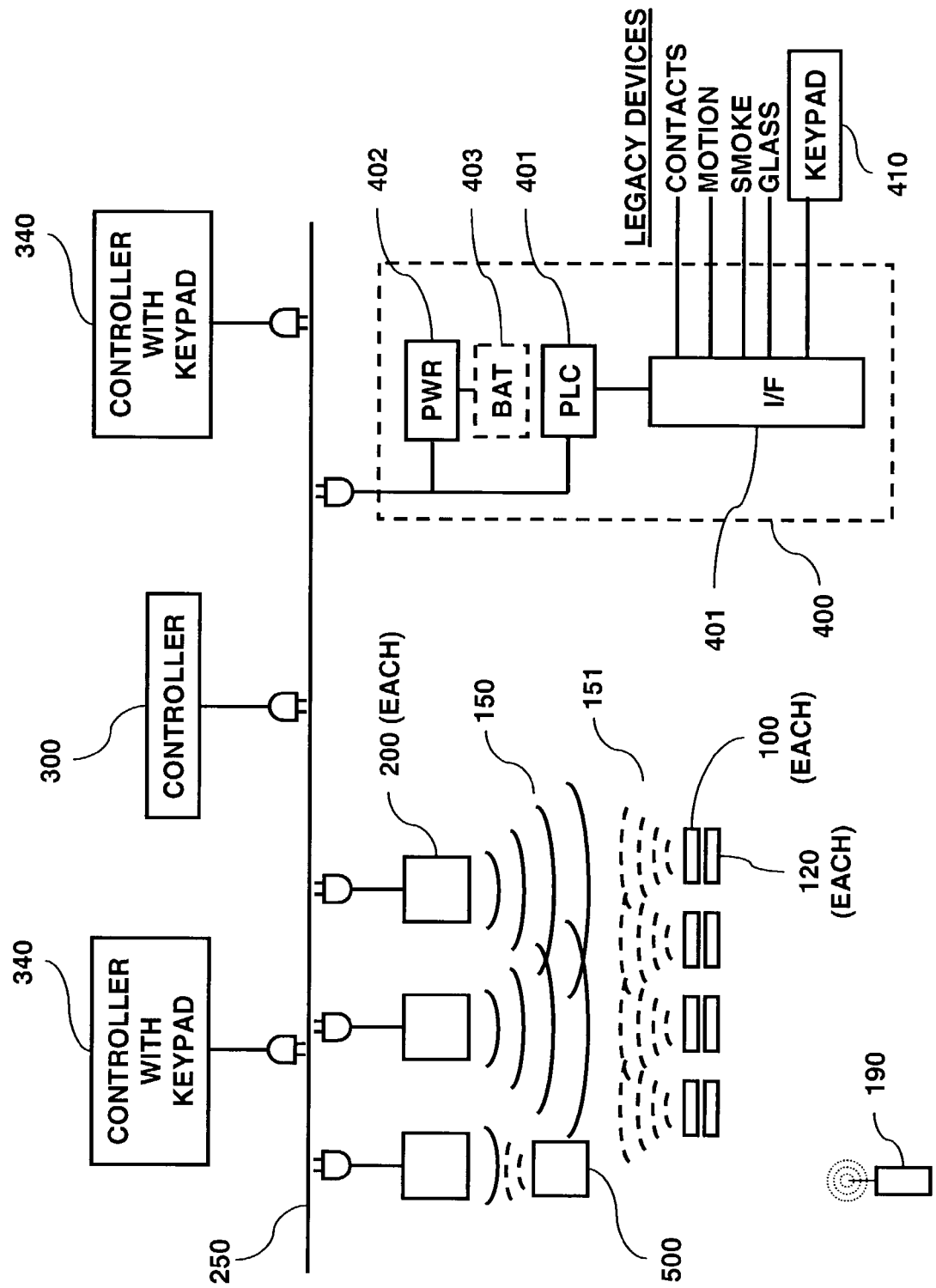
FIG. 2 shows the communications relationships between the various elements of the present invention.

There are 4 primary parts to the security system: an intrusion sensor 120, an RFID transponder 100, an RFID reader 200, and a controller 300. FIG. 1 shows an example of the layout for a small house and FIG. 2 shows a general architecture of the security system. At each opening in the house, such as windows 353 and doors 352, for which monitoring is desired, an intrusion sensor 120 and RFID transponder 100 are mounted. In approximately each major room of the house, an RFID reader 200 is mounted. Each RFID reader 200 is in wireless communications with one or more RFID transponders 100. In general, each RFID reader 200 is responsible for the RFID transponders 100 in the room associated with each RFID reader 200. However, as is well understood to those skilled in the art, the range of wireless communications is dependent, in part, upon many environmental factors in addition to the specific design parameters of the RFID readers 200 and RFID transponders 100. It is likely, in the average residential home, that most RFID readers 200 will not only be able to communicate with RFID transponders 100 in the same room as the RFID reader 200, but also with RFID transponders 100 in other rooms. Therefore, in many cases with this system it will be possible to either install fewer RFID readers 200 than major rooms in a building, or to follow the guideline of one RFID reader 200 per major room, creating a system with excellent spatial antenna diversity as well as redundancy in the event of single component failure. The RFID reader 200 obtains its power from a nearby standard AC power outlet 230. In fact, the preferred packaging of the RFID reader 200 has the plug integrated into the package such that the RFID reader 200 is plugged into a standard outlet 230 without any associated extension cords, power strips, or the like.

At least one controller 300 is required in each security system, but in many cases it will increase the convenience of the homeowner or occupants of the building to have more than one controller 300. Many traditional hardwired security systems have separate alarm panels and keypads. The alarm panel contains the controller for the system while the keypad is a relatively dumb remote access device. This is due, in part, to the requirement that the alarm panel contain a relatively bulky lead acid battery to power the electronics of the alarm panel, the keypads, and various sensors such as motion detectors and glass breakage detectors. Therefore, the alarm panel is typically hidden in a closet to hide the bulkiness of the panel while only the smaller, more attractive keypad is visibly mounted on a wall. The controller 300 of the present invention does not require a lead acid battery because the controller 300, the RFID readers 200, and other associated sensors are each powered locally. The controller 300 obtains its power from a nearby standard AC power outlet.

Figure 3:
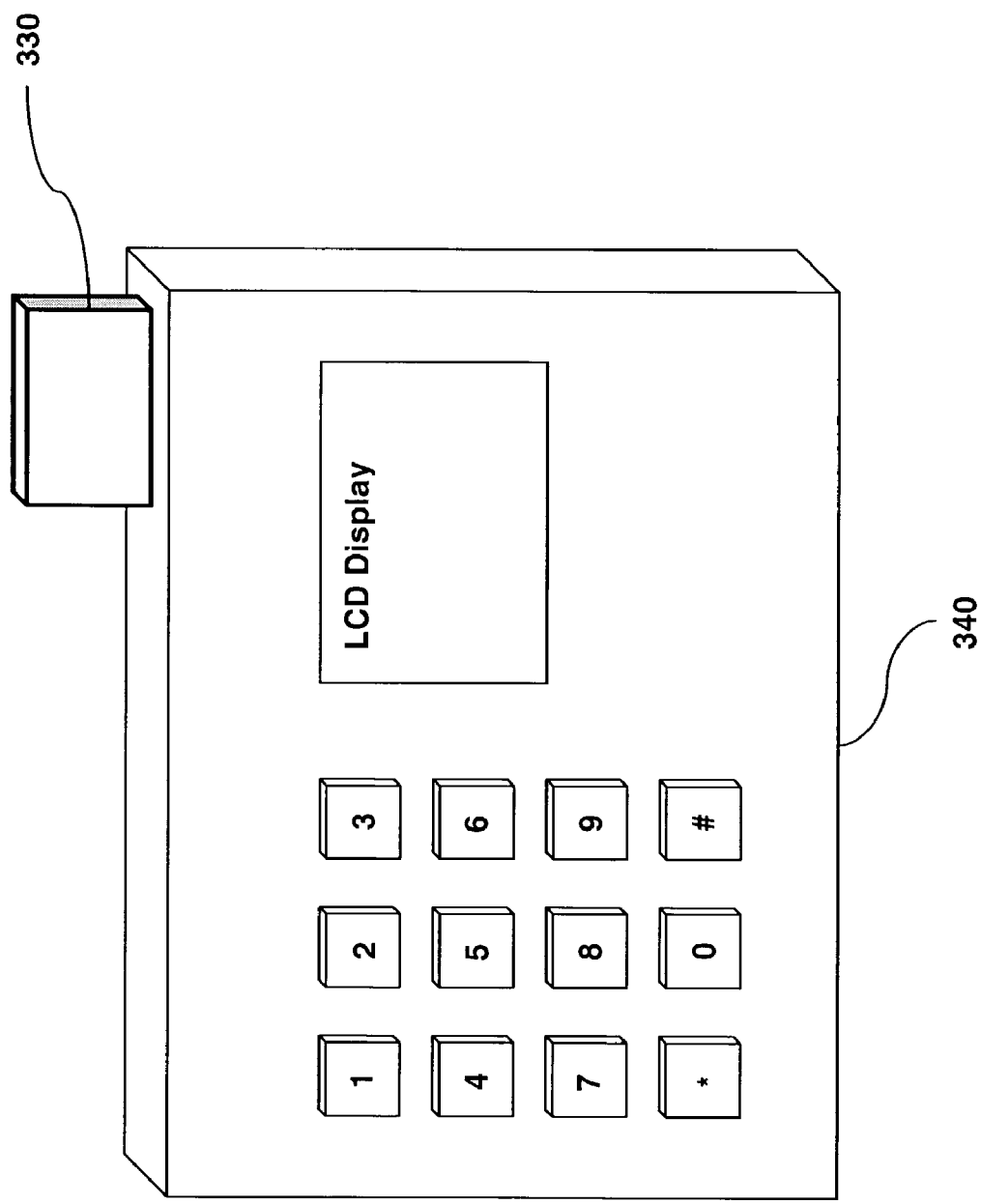
FIG. 3 shows an example embodiment of a controller with integrated keypad and display.
Figure 4B:
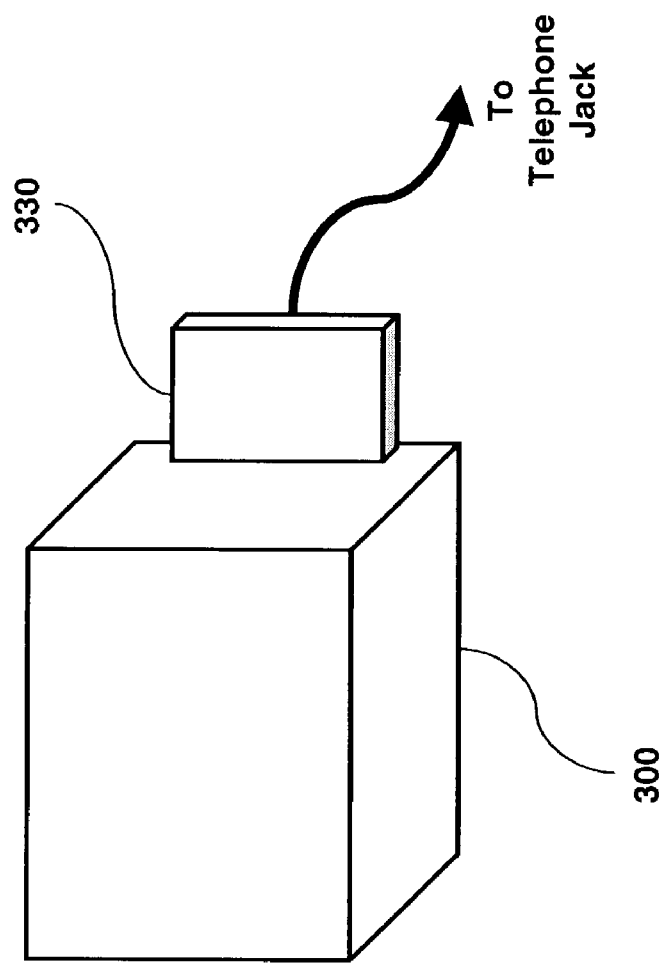
FIG. 4B shows an example embodiment of a controller without keypad.

The controller 300 of the present invention may be constructed in at least two forms. The first form 340, shown in FIG. 3, includes an integrated user interface in the form of a keypad 320 and display 321, and the second form, shown in FIG. 4B, does not include a keypad 320 or display 321. The controller 300 typically contains the following major logic functions:

configuration of the security system whereby each of the other components are identified, enrolled, and placed under control of the master controller, receipt and interpretation of daily operation commands executed by the homeowner or building occupants including commands whereby the system is placed, for example, into armed or monitoring mode or disarmed for normal building use, communications with other controllers 300, if present, in the system including exchange of configuration information and daily operation commands as well as arbitration between the controllers 300 as to which controller 300 shall be the master controller, communications with RFID readers 200 and other sensors, such as passive infrared sensors 242, in the security system including the sending of various commands and the receiving of various responses and requests, processing and interpretation of data received from the RFID readers 200 including data regarding the receipt of various signals from the sensors and RFID transponders 100 within read range of each RFID reader 200, monitoring of each of the sensors, both directly and indirectly, to determine whether a likely intrusion has occurred, whether glass breakage has been detected, or whether motion has been detected by a microwave- and/or passive infrared-based device, deciding, based upon the configuration of the security system and the results of monitoring activity conducted by the controller 300, whether to cause an alert, causing an alert, if necessary, by some combination of audible indication, dialing through the public switched telephone network (PSTN) 373 to deliver a message to an emergency response agency, or sending a message through one or more commercial mobile radio service (CMRS) 370 operators to an emergency response agency 374.

Figure 13:
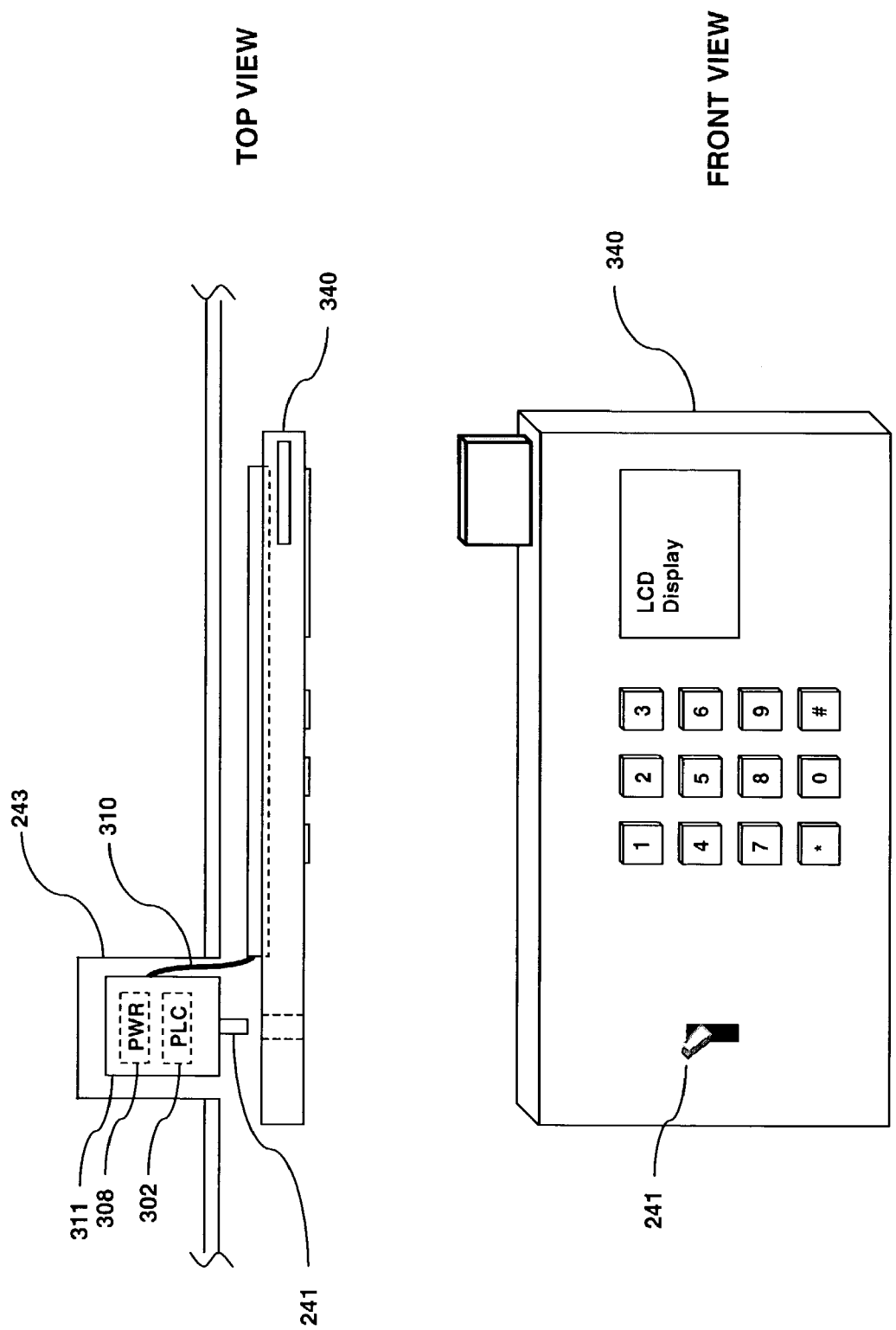
FIG. 13 shows one way in which the keypad may be mounted onto an electrical box while permitting a light switch to protrude.

If the homeowner or building owner installs only a single controller 300 in a security system of the present invention, then the controller 300 will likely include an integrated keypad 320. In this case, the controller 300 may take the form 340 shown in FIG. 3. The controller's size and shape, in this case, are dictated by the ergonomics of providing a keypad 320 with tactile feedback and an LCD-based display 321 by which the controller 300 can display messages and the results of commands and operations for viewing by the homeowner or building owner. The controller 300 with keypad 320 can be mounted, for example, onto the type of electrical box 243 used for light switches 241. One form of packaging that is particularly suited to mounting onto electrical boxes 243 used for light switches 241 is shown in FIG. 13. In this figure, the keypad/controller 340 is packaged with a light switch 241 so that the installation of the present security system does not result in the loss of an accessible light switch 241. The power supply 308 and power line communications interface circuits 302 are packaged with a light switch 241 into an AC interface unit 311 and installed into electrical box 243. A wire connection 310 protrudes from this AC interface unit 311 for connection to the keypad/controller 340. The keypad/controller 340 is then mounted onto the wall in such a manner that the light switch 241 portion of the AC interface unit 311 protrudes through the housing of the keypad/controller 340, thereby enabling both the light switch 241 to be accessible and the keypad/controller 340 to access AC power through an existing electrical box 243.

Figure 5:
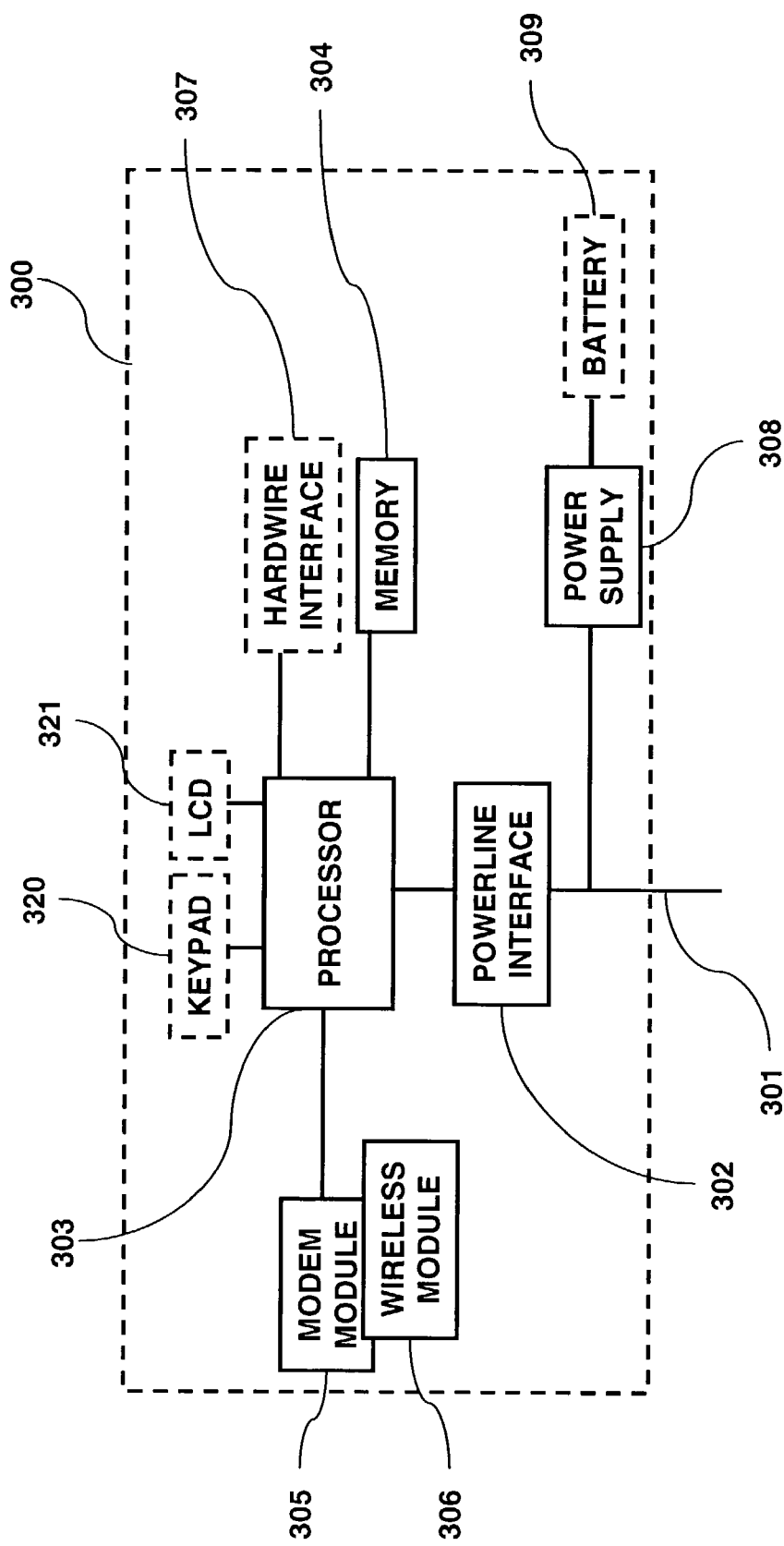
FIG. 5 shows an architecture of the controller.
Figure 6:
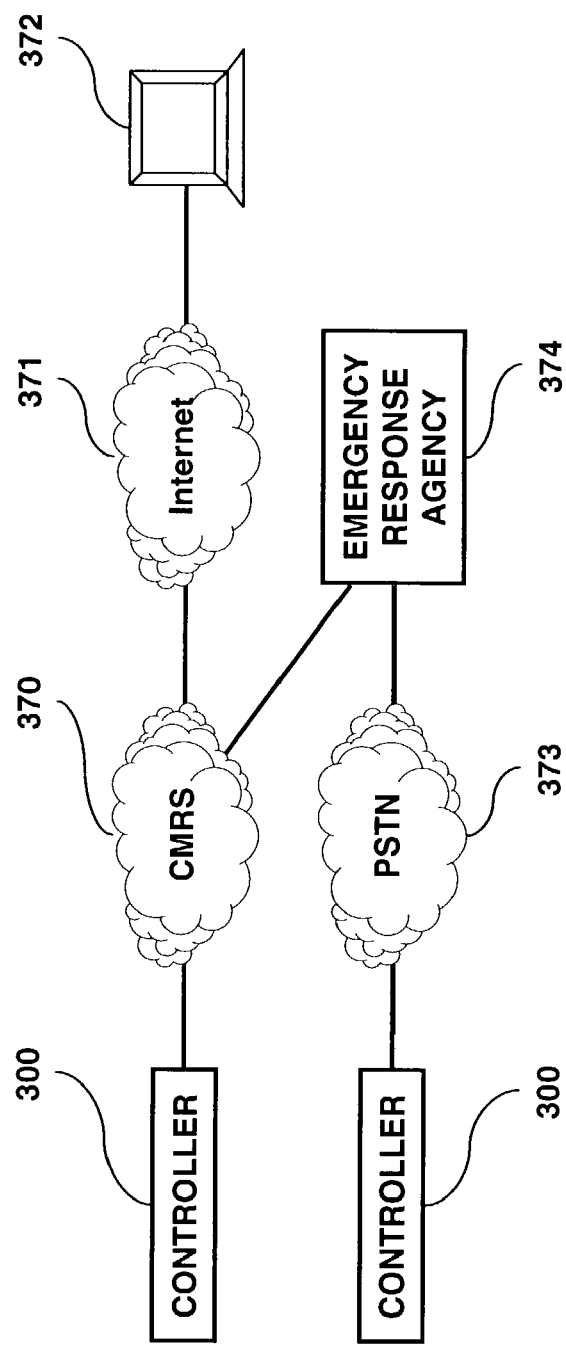
FIG. 6 shows example communications relationships between the controllers and various external networks and entities.

A block diagram of the controller 300 is shown in FIG. 5. The major logic functions are implemented in the firmware or software executed by the microprocessor 303 of the controller 300. The microprocessor 303 contains non-volatile memory 304 for storing the firmware or software as well as the configuration of the system. The controller 300 has its own power supply 308 and can also contain a backup battery 309, if desired, for use in case of loss of normal power. The configuration of the system is generated through a process of enrollment, discussed later, and user input typically entered through a keypad 320. The controller 300 will typically store the configuration information in the form of one or more tables in non-volatile memory 304. The table entries enable the controller 300 to store the identity of each RFID reader 200, along with the capabilities of each RFID reader 200, the identity of each RFID transponder 100, along with the type of RFID transponder 100 and any associated intrusion sensors 120, and the association of various sensors in the system. For example, as discussed later, it is advantageous for the controller 300 to associate particular passive infrared sensors 242 with particular RFID readers 200 containing a microwave Doppler motion function. With respect to each RFID transponder 100, the table entries may further contain radio frequency, power level, and modulation technique data. These table entries can enable the controller 300 to command an RFID reader 200 to use a particular combination of radio frequency, modulation technique, antenna, and power level for a particular RFID transponder 100, wherein the combination used can vary when communicating with each separate RFID transponder 100. Furthermore, the tables may contain state information, such as the reported status of any battery 111 included with an RFID transponder 100.

If the homeowner or building owner installs a second (or more) controller 300 in a security system of the present invention, then the second controller 300 may include an integrated keypad 320 or it may include only the controller 300 functions without a keypad. The controller 300 without a keypad can take the form shown in FIG. 4B.

With or without the keypad 320, a second controller 300 can still serve to function as an alternate or backup controller 300 for cases in which the first controller 300 fails, such as component failure, disablement or destruction by an intruder, or loss of power at the outlet where the first controller 300 is plugged in. Loss of power can occur if the breaker for that power circuit "trips" causing the circuit to be disconnected from the rest of the building. In this "tripping" scenario, even the presence of a backup battery 309 will not help the situation since the controller's communications can be disconnected from the other security system components if power line carrier communication is being used. If, however, multiple controllers 300 or controllers 300 and RFID readers 200 are on the same circuit, then the physical communications path through the power lines 250 is not broken even if the breaker trips. In the general case, however, the use of a second controller 300 can be of high value to the building owner, especially if the second controller 300 is located on a separate power circuit from the first controller 300.

The controller 300 will typically communicate with the RFID readers 200 using a power line communication interface circuit 302. The homeowner or building owner receives maximum benefit of this inventive security system by avoiding the installation of additional wires. Power line carrier protocols such as power line communications interface circuit 302 allow the sending of data between devices using the existing power lines 250 in a building. One of the first protocols for doing this is known as the X-10 protocol. However, there are now a number of far more robust protocols in existence. One such protocol is known as CEBus (for Consumer Electronics Bus), which was standardized as EIA600. There are a growing number of other developers of power line carrier protocols such as Easyplug/Inari, Itran Communications, and nSine. For the inventive security system, the primary driver for deciding upon a particular power line carrier protocol is the availability of chipsets, reference designs, and related components at high manufacturing volumes and at low manufacturing cost. Furthermore, compatibility with other products in the home automation field would be an additional advantage. For these reasons and others, the inventive security system presently uses the Intellon chipset INT51X1, which implements the standardized protocol known as HomePlug. This particular chipset offers sufficient data speeds over standard power lines 250 at a reported distance of up to 300 meters. The HomePlug standard operates using frequencies between 4.3 and 20.9 MHz, and includes security and encryption protocols to prevent eavesdropping over the power lines 250 from adjacent houses or buildings. The specific choice of which protocol to use is at the designer's discretion, and does not subtract from the inventiveness of this system. The power line communications interface circuit 302 is connected to the outlet 230 via an AC connector 301.

For various reasons, it is also possible that a particular building owner will not desire to use power line carrier communications. For example, the occupants of some buildings may be required to meet certain levels of commercial or military security that preclude permitting signals on power lines that might leak outside of the building. Therefore a form of the controller 300 may also be configured to use hardwired connections through a hardwire interface 307 to one or more RFID readers 200.

Homeowners and building owners generally desire one or two types of alerts in the event that an intrusion is detected. First, an audible alert may be desired whereby a loud siren is activated both to frighten the intruder and to call attention to the building so that any passers-by may take notice of the intruder or any evidence of the intrusion. However, there are also scenarios in which the building owner prefers the so called silent alert whereby no audible alert is made so as to lull the intruder into believing he has not been discovered and therefore may still be there when law enforcement personnel arrive. The second type of alert involves messaging an emergency response agency 374, indicating the detection of an intrusion and the identity of the building. The emergency response agency 374 may be public or private, depending upon the local customs, and so, for example, may be an alarm services company or the city police department.

The controller 300 of the inventive system supports the second type of foregoing alert by including a slot capable of receiving an optional module 305 or 306. This module 305 or 306 is preferably in the form of an industry standard PCMCIA or compact flash (CF) module 330, thereby allowing the selection of any of a growing variety of modules made by various vendors manufactured to these standards. The module may either be a modem module 305 for connection to a public switched telephone network (PSTN) 373 or a wireless module 306 for connection to a commercial mobile radio service (CMRS) network 370 such as any of the widely available CDMA, TDMA, or GSM-based wireless networks. If the building owner has selected power line carrier communications as the mechanism for the controller 300 to communicate with the RFID reader 200, then the controller 300 can also communicate with a power line phone module such as the GE TL-96596/7 or Phonex PX-441/2 families, among others. The use of the power line phone module allows the connection to the PSTN 373 to be in a different location than that of controller 300, if desired.

Certain building owners will prefer the higher security level offered by sending an alert message through a CMRS 370 network. The use of a CMRS network 370 by the controller 300 overcomes a potential point of failure that occurs if the intruder were to cut the telephone wires prior to attempting an intrusion. If the building owner has installed at least two controllers 300 in the system, one controller 300 may have a wireless module 306 installed and a second may have a modem module 305 installed. This provides the inventive security system with two separate communication paths for sending alerts to the emergency response agency 374. By placing the controllers 300 in very different locations in the building, the building owner significantly decreases the likelihood that an intruder can discover and defeat the security system.

The controller 300 offers an even higher level of security that is particularly attractive to marketing the inventive security system to apartment dwellers. Historically, security systems of any type have not been sold and installed into apartments for several reasons. Apartment dwellers are more transient than homeowners, making it difficult for the dweller or an alarm services company to recoup an investment in installing a system. Of larger issue, though, is the small size of apartments relative to houses. The smaller size makes it difficult to effectively hide the alarm panel of prior art security systems, making it vulnerable to discovery and then disconnection or destruction during the pre-alert period. The pre-alert period of any security system is the time allowed by the alarm panel for the normal homeowner to enter the home and disarm the system by entering an appropriate code or password into a keypad. This pre-alert time is often set to 30 seconds to allow for the fumbling of keys, the carrying of groceries, the removal of gloves, etc. In an apartment scenario, 30 seconds is a relatively long time in which an intruder can search the apartment seeking the alarm panel and then preventing alert. Therefore, security systems have not been considered a viable option for most apartments. Yet, at least 35% of the households in the U.S. live in apartments and their security needs are not less important than those of homeowners.

The inventive security system includes an additional remote monitoring function in the controller 300, which can be selectively enabled at the discretion of the system user, for use with the wireless module 306. Beginning in 2001, most CMRS 370 networks based upon CDMA, TDMA, or GSM have supported a feature known as two-way Short Messaging Service (SMS). Available under many brand names, SMS is a connectionless service that enables the sending of short text messages between a combination of wireless and/or wired entities. The controller 300 includes a function whereby the controller 300 can send a message, via the wireless module 306 and using the SMS feature of CMRS 370 networks, to a designated remote processor at an alarm services company, or other designated location, at the time that a pre-alert period begins and again at the time that the security system has been disabled by the normal user, such as the apartment dweller, by entering the normal disarm code. Furthermore, the controller 300 can send a different message, via the wireless module 306 and using the SMS feature of CMRS networks 370, to the same designated processor if the normal user enters an abnormal disarm code that signals distress, such as when, for example, an intruder has forced entry by following the apartment dweller home and using a weapon to force the apartment dweller to enter her apartment with the intruder and disarm the security system.

Figure 7:
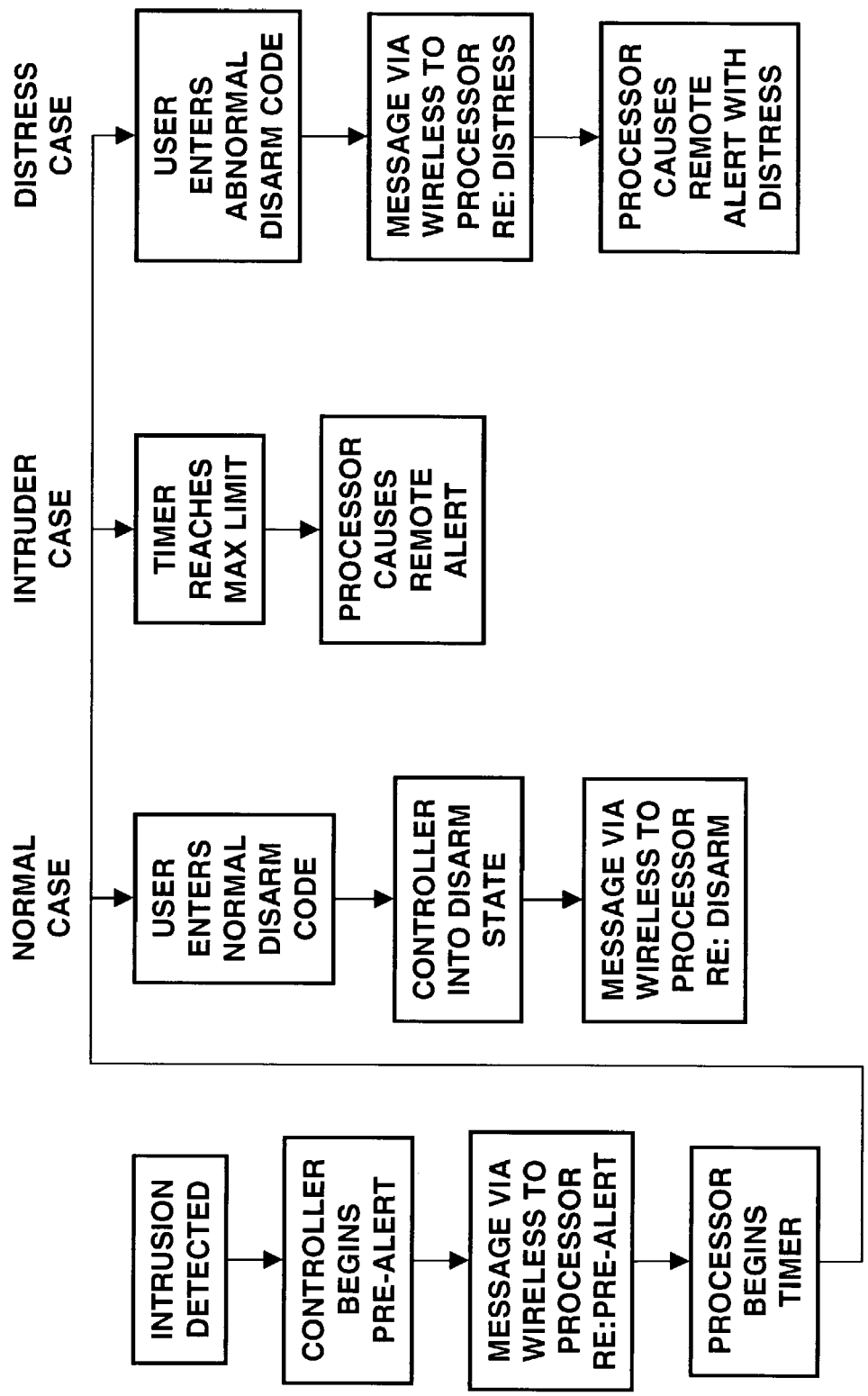
FIG. 7 is a flow chart for a method of providing a remote monitoring function.

In logic flow format, the remote monitoring function operates as shown in FIG. 7 and described in more detail below, assuming that the function has been enabled by the user:

an intrusion is detected in the building, such as the apartment, the controller 300 begins a pre-alert period, the controller 300 sends a message via the wireless module 306 to a designated remote processor that may be remotely monitoring security systems, whereby the message indicates the identity of the security system and the transition to pre-alert state, the designated remote processor begins a timer (for example 30 seconds or any reasonable period allowing for an adequate pre-alert time), if the person causing the intrusion is a normal user under normal circumstances, the normal user will enter the normal disarm code, the controller 300 ends the pre-alert period, and enters a disarmed state, the controller 300 sends a message via the wireless module 306 to the designated remote processor, whereby the message indicates the identity of the security system and the transition to disarm state, if the person causing the intrusion is an intruder who does not know the disarm code and/or disables and/or destroy the controller(s) 300 of the security system, the timer at the designated remote processor reaches the maximum time limit (30 seconds in this example) without receiving a message from the controller 300 indicating the transition to disarm state, the designated remote processor may remotely cause an alert indicating that a probable intrusion has taken place at the location associated with the identity of the security system, if the person causing the intrusion is an authorized user under distressed circumstances (i.e., gun to back), the authorized user will enter an abnormal disarm code indicating distress, the controller 300 sends a message via the wireless module 306 to the designated remote processor, whereby the message indicates the identity of the security system and the entering of an abnormal disarm code indicating distress, the designated remote processor may remotely cause an alert indicating that an intrusion has taken place at the location associated with the identity of the security system and that the authorized user is present at the location and under distress.

As can be readily seen, this inventive remote monitoring function now enables the installation of this inventive security system into apartments without the historical risk that the system can be rendered useless by the discovery and disablement or destruction by the intruder. With this function enabled, even if the intruder were to disable or destroy the system, a remote alert could still be signaled because a message indicating a transition to disarm state would not be sent, and a timer would automatically conclude remotely at the designated processor. This function is obviously not limited to just apartments and could be used for any building.

With the wireless module 306 installed, a controller 300 can also be configured to send an SMS-based message through the CMRS 370 and the Internet 371 to any email address based upon selected user events. For example, an individual away from home during the day may want a message sent to his pager, wireless phone, or office email 372 if the inventive security system is disarmed at any point during the day when no one is supposed to be at home. Alternately, a parent may want a message sent when a child has retuned home from school and disarmed the security system. Perhaps a homeowner has provided a temporary disarm code to a service company scheduled to work in the home, and the homeowner wants to receive a message when the work personnel have arrived and entered the home. By assigning different codes to different family members and/or work personnel, the owner of the security system can discriminate among the persons authorized to disarm the system. Any message sent, as described herein, can contain an indication identifying the code and/or the person that entered the disarm code. The disarm code itself is not sent for the obvious security reasons, just an identifier associated with the code.

With the modem module 305 or the wireless module 306 installed, the controller 300 can send or receive updated software, parameters, configuration, or remote commands.

For example, once the security system has been configured, a copy of the configuration, including all of the table entries, can be sent to a remote processor for both backup and as an aid to responding to any reported emergency. If, for any reason, the controller 300 ever experienced a catastrophic failure whereby its configuration were ever lost, the copy of the configuration stored at the remote processor could be downloaded to a restarted or replacement controller 300. Certain parameters, such as those used in glass breakage detection, can be downloaded to the controller 300 and then propagated, in this example, to the appropriate glass breakage detection functions that may be contained within the system. Therefore, for example, if a homeowner were experiencing an unusual number of false alarm indications from a glass breakage detection function, remote technical personnel could remotely make adjustments in certain parameters and then download these new parameters to the controller 300. The controller 300 can also report periodic status and/or operating problems detected by the system to the emergency response agency 374 or to the manufacturer of the system. One example of the usefulness of this function is that reports of usage statistics, status, and/or problems can be generated by an emergency response agency 374 and a copy provided to the customer as part of his monthly bill. Furthermore, the usage statistics of similarly situated customers can be compared and analyzed for any useful patterns.

When there are multiple controllers 300 installed in a single security system, the controllers 300 arbitrate among themselves to determine which controller 300 shall be the master controller for a given period of time. The preferred arbitration scheme consists of a periodic self-check test by each controller 300, and the present master controller may remain the master controller as long as its own periodic self-check is okay and reported to the other controllers 300 in the security system. If the present master controller fails its self-check test, and there is at least one other controller 300 whose self-check is okay, the failing master controller will abdicate and the other controller 300 whose self-check is okay will assume the master controller role. In the initial case or subsequent cases where multiple controllers 300 (which will ideally be the usual case) are all okay after periodic self-check, then the controllers 300 may elect a master controller from among themselves by each choosing a random number from a random number generator, and then selecting the controller 300 with the lowest random number. There are other variations of arbitration schemes that are widely known, and any number are equally useful without deducting from the inventiveness of permitting multiple controllers 300 in a single security system, as long as the result is that in a multi-controller 300 system, no more than one controller 300 is the master controller at any one time. In a multi-controller system, one controller 300 is master controller and the remaining controllers 300 are slave controllers, keeping a copy of all parameters, configurations, tables, and status but not duplicating the actions of the master controller.

Figure 8A:
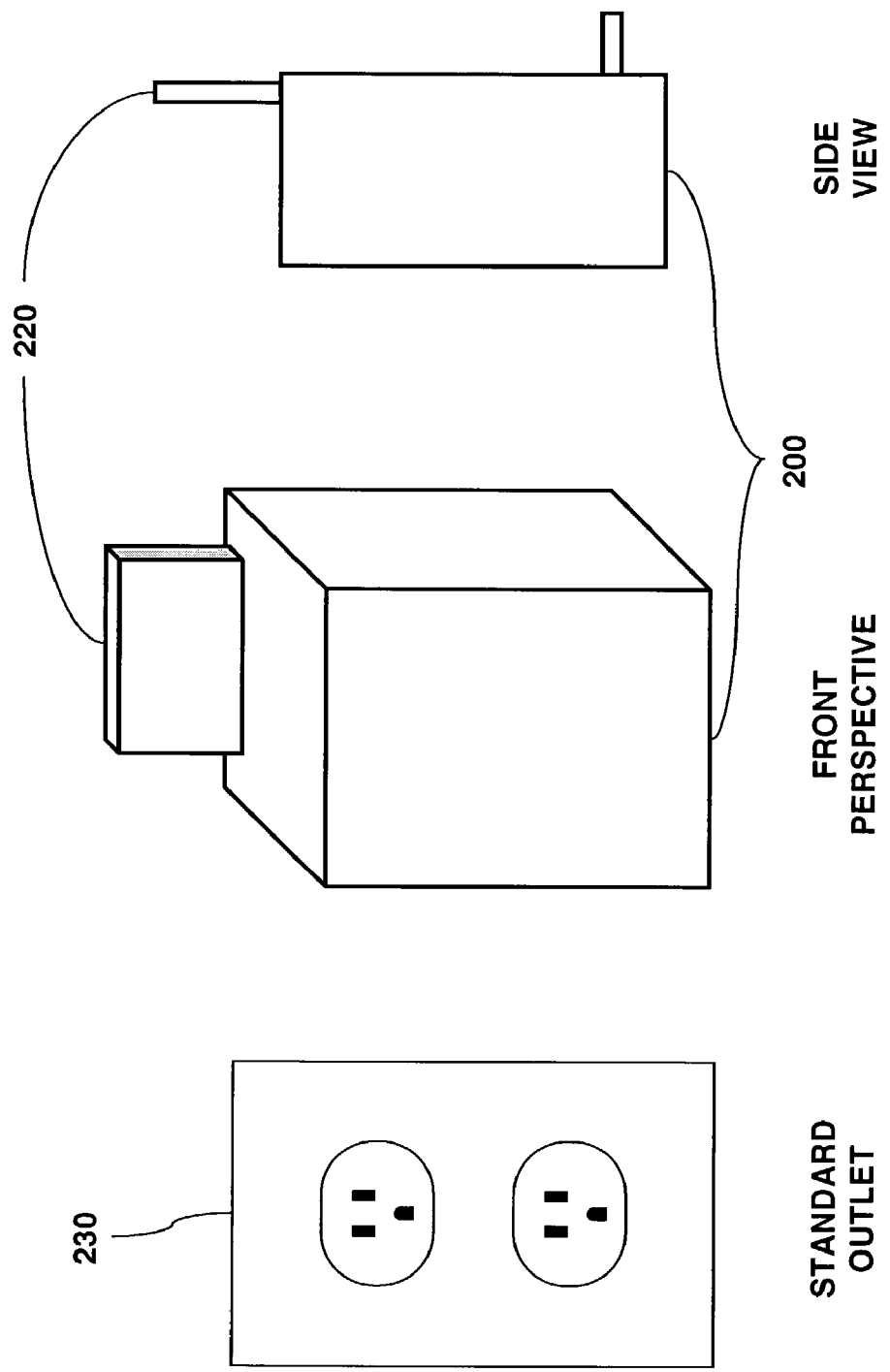
FIG. 8A shows an example embodiment of an RF reader without an acoustic transducer, and in approximate proportion to a standard power outlet.

The RFID reader 200 is typically designed to be inexpensively manufactured since in each installed security system, there may be approximately one RFID reader 200 for each major room to be monitored. In a typical embodiment, the RFID reader 200 is constructed in the form factor approximating the length and width dimensions of a standard wall outlet cover 230. FIG. 8A shows the typical size of the RFID reader 200, which is approximately 3" by 4" by 2".

From a mechanical standpoint, both the RFID reader 200 and the controller 300 are provided with threaded screw holes on the rear of the packaging, as shown in FIG. 11A. If desired by the user installing the system of the present invention, holes can be drilled into a plate 232, which may be an existing outlet cover (for example, if the user has stylized outlet covers that he wishes to preserve) whereby the holes are of the size and location that match the holes on the rear of the RFID reader 200 or the controller 300 packaging. Alternately, the user can employ a plate in the shape of an extended outlet cover 231 shown in FIG. 11B which provides additional mechanical support through the use of additional screw attachment points. Then, as shown in FIGS. 11A and 11B, the plate 232 or 231 can be first attached to the rear of the RFID reader 200 and the controller 300 packaging, using the screws 234 shown, and if necessary, spacers or washers. The RFID reader 200 or the controller 300 can be plugged into the outlet 230, whereby the plate 232 or 231 is in alignment with the sockets of the outlet 230. Finally, an attachment screw 233 can be used to attach the plate 232 or 231 to the socket assembly of the outlet 230. This combination of screws provides positive mechanical attachment whereby neither the RFID reader 200 nor the controller 300 can accidentally be jostled or bumped out of the outlet 230. Furthermore, the presence of the attachment screw 233 will slow down any attempt to rapidly unplug the RFID reader 200 or the controller 300.

Figure 9:
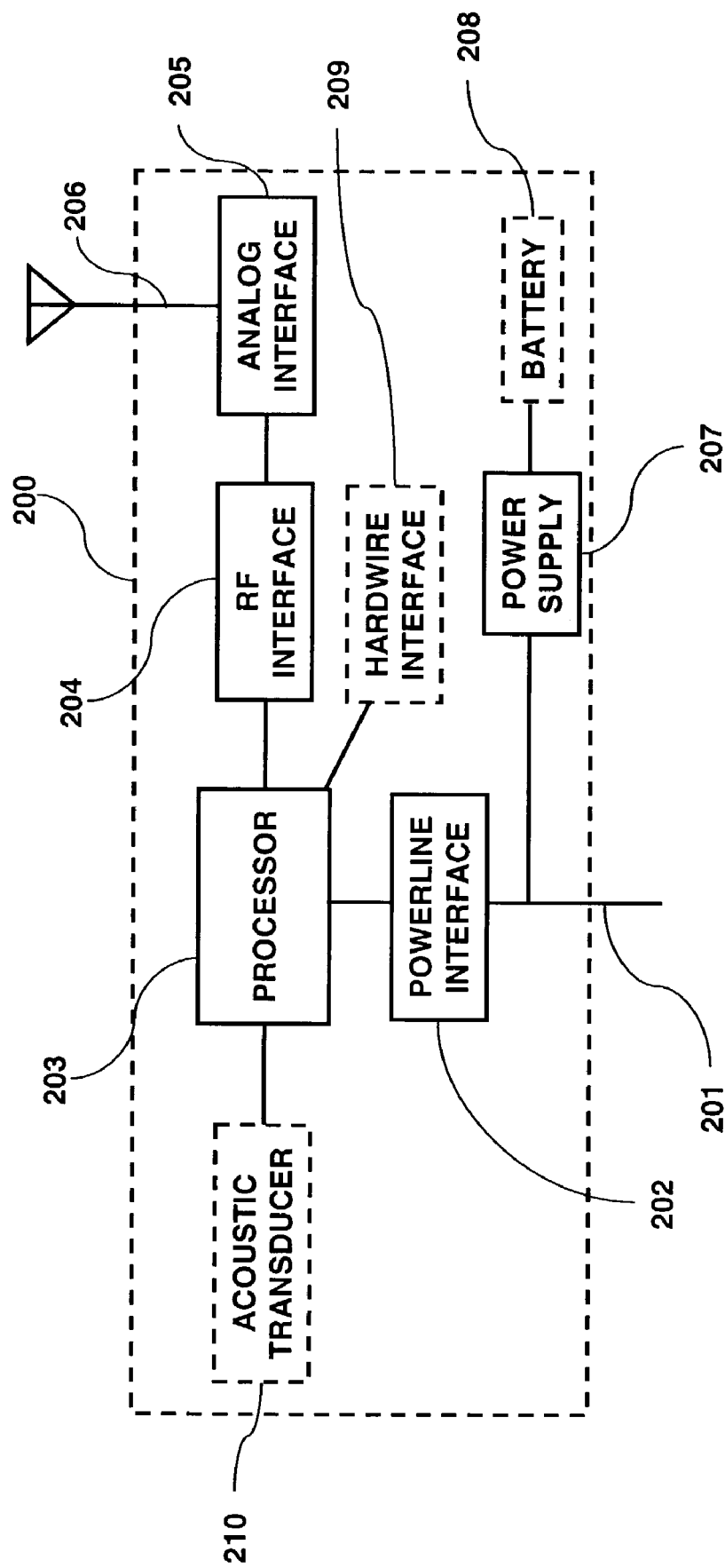
FIG. 9 shows an architecture of the RF reader.

FIG. 9 shows a block diagram of the RFID reader 200 with a microprocessor 203 controlling transmission and receive functions through an RF interface 204 chipset, an analog interface or circuits 205, and antenna 206. While FIG. 9 shows only a single antenna 206 for simplicity, as will be discussed later it may be advantageous for the RFID reader 206 to contain more than one antenna 206 to provide increased directivity. When more than one antenna 206 is present, the analog circuits 205 will typically enable the switching of the RF interface 204 between the multiple antenna elements 206. If the configuration of the RFID reader 200 includes only a single antenna, it can take the form shown in FIG. 8A with one PC motherboard containing most of the components, with a slot for accepting a daughter card in the form factor of an industry standard PCMCIA or compact flash (CF) module 220. These module sizes are preferred because the growing variety of modules made by various vendors and manufactured to these standards are leading to rapidly declining component and manufacturing costs for chipsets, discrete resistors, capacitors, inductors, antennas, packaging, and the like. Furthermore, it may ease the process of FCC equipment certification to make the intentional radiating portions of the RFID reader into a mechanical package separate from the remaining circuits. It is not a requirement of this present invention that the RFID reader 200 be constructed in these two parts as shown in FIG. 8A (motherboard plus daughter board); rather it is one possible choice because of the opportunity to lower development and manufacturing costs. It is likely that variations of the RFID reader 200 can also be produced with all components integrated into a single package, perhaps even smaller in size, without detracting from the present inventive architecture and combination of functions, circuits, and logic. For example, as will be discussed later, when multiple antennas 206 are used the packaging is generally integrated. The present size of the RFID reader 200 is actually dictated by the size of the presently chosen Microtran transformer used in the power supply 207 circuits. The packaging of the RFID reader 200 also permits the installation of a battery 208 for backup purposes in case normal power supply 207 is interrupted.

The RFID reader 200 will typically communicate with the RFID transponders 100 using frequencies in one or both of two unlicensed bands: the 902 to 928 MHz band and the 2.435 to 2.465 GHz band. These bands permit the use of unlicensed secondary transmitters, and are part of the bands that have become popular for the development of cordless phones and wireless LAN networks, thereby leading to the wide availability of many low cost components that are required for this invention, such as the RF interface 204 chips, analog interface 205 components, and antennas 206.

Transmissions in this portion of the band are regulated by FCC rules 47 CFR 15.245, which permit field strengths of up to 500 mV/m at 3 meters (measured using an average detector function; the peak emission limit may be up to 20 dB higher). This implies an averaged transmission power of 75 mW and a peak transmission power of up to 7.5 Watts. Furthermore, transmissions in this band do not suffer the same duty cycle constraints as existing wireless security system transmitters operating under 47 CFR 15.231 (a). However, in order to use the rules of 47 CFR 15.245, the RFID reader 200 must operate as a field disturbance sensor, which it does. Existing wireless security system transmitters are not field disturbance sensors. Most other products using these unlicensed bands are other transient transmitters operating under 47 CFR 15.247 and 47 CFR 15.249, and so even though it may seem that many products are available and in use in these bands, in reality there remains a lot of available space in the band, especially in residential homes. Most transmitters operating under 47 CFR 15.247 are frequency hopping systems whereby the given spectrum is divided into channels of a specified bandwidth, and each transmitter can occupy a given channel for only 400 milliseconds. Therefore, even if interference occurs, the time period of the interference is brief. In most cases, the RFID readers 200 can operate without incurring interference or certainly without significant interference.

As discussed in the foregoing section on the controller 300, the preferred mechanism of communications between the RFID reader 200 and the controller 300 is using a power line carrier protocol or interface 202. This mechanism of communications permits the homeowner or building owner to install the RFID readers 200 by simply plugging each into an outlet 230 in approximately each major room. The power line carrier interface 202 is connected to the outlet 230 via an AC connector 201. The RFID readers 200 and controllers 300 can then use the method disclosed later to associate themselves with each other and begin communications without the need to install any new wires. The present design of the RFID reader 200 employs the Intellon INT51X1 paired with an Ubicom processor to accomplish the power line communications. Other chipsets may be chosen, however, without deducting from the present invention. However, as also discussed in the foregoing, there may be some users with higher security requirements that do not permit the use of power lines that may be shared with users outside of the building, and therefore the design permits the use of hardwired connections or interface 209 between the controllers 300 and the RFID readers 200.

Each RFID reader 200 communicates with one or more RFID transponders 100 typically using modulated backscatter techniques. These techniques are very well understood by those skilled in the art, and have been well discussed in a plethora of literature including patent specifications, trade publications, marketing materials, and the like. For example, the reader is directed to RFID Handbook, Radio-Frequency Identification: Fundamentals And Applications, by Klaus Finkenzeller, published by John Wiley, 1999. U.S. Pat. No. 6,147,605, issued to Vega et al., provides additional material on the design and theory of modulated backscatter techniques. Therefore, this same material is not covered here. Presently, a number of companies produce miniaturized chipsets, components, and antennas for RFID readers and transponders. Many of these chipsets, though designed for the 13.56 MHz band, are applicable and/or will be available in the higher bands such as those discussed here. For example, Hitachi has recently announced the manufacture of its mu-chip, which is a 2.4 GHz RFID transponder measuring only 0.4 mm square. The most important point here is that the wide availability of parts permits the designer many options in choosing the specific design parameters of the RFID reader 200 and RFID transponder 100 and therefore the innovative nature of this invention is not limited to any specific circuit design implementing the wireless link between the RFID reader 200 and RFID transponder 100.

The extensive literature on RFID techniques and the wide availability of parts does not detract from the innovative application and combination of these techniques and parts to the present invention. Most applications of RFID have been applied to mobile people, animals, or things that must be authorized, tracked, counted, or billed. No one has previously considered the novel application of low cost RFID components to solve the problem of monitoring fixed assets such as the windows 353, doors 352, and other structures that comprise the openings of buildings. All present transmitters constructed for prior art wireless security systems are several times more expensive than the RFID-based design of the present invention because of the additional components required for active transmission. Furthermore, no one has considered the use of multiple, distributed low cost RFID readers 200 with overlapping coverage so that a building's security is not dependent on a single, vulnerable, and historically unreliable central transceiver.

There are several examples of the advantages that the present RFID approach offers versus prior art wireless security systems. Present wireless security systems limit status reporting by transmitters to times even longer than the FCC restriction of once per hour in order to conserve the battery in the transmitter. The RFID approach does not have the same battery limitation because of the modulated backscatter design. Prior art wireless security systems are subject to both false positive and false negative indications because centrally located transceivers have difficulty distinguishing noise from real signals. The central transceiver has little control over the time of transmission by a transmitter and therefore must evaluate every signal, whether noise, interference, or real transmission. This is made more difficult because the prior art central transceivers are not always located centrally in the house. Professional installers generally hide these central transceivers in a closet or similar enclosure to prevent an intruder from easily spotting the central transceivers and disabling them. Each wall or door through which signals must pass to reach a central transceiver can cause loss of up to 10 dB in signal power. In contrast, the RFID approach places all of the transmission control in the master controller and RFID reader 200. The RFID reader 200 only looks for a reflected response 151 during a transmission sequence 150. Therefore the RFID reader 200 can be simpler in design. Some centralized transceivers attempt to use diversity antennas to improve their reliability; however, these antennas are separated only by the width of the packaging, which is frequently much less than one wavelength of the chosen frequency (i.e., 87 cm at 345 MHz and 69 cm at 433 MHz). As is well known to those skilled in the art of wireless, spatial diversity of antennas works best when the antennas are separated by more than one wavelength at the chosen frequency. With the present invention, RFID readers 200 are separated into multiple rooms, creating excellent spatial diversity and the ability to overcome environmental effects such as multipath and signal blockage. Multipath and signal blockage are effects of the RF path between any transmitter and receiver. Most cellular systems use diversity antennas separated by multiple wavelengths to help overcome the effects of multipath and signal blockage. Under the present invention, in most installations there will be multiple RFID readers 200 in a building. There will therefore be an independent RF path between each RFID reader 200 and each RFID transponder 100. The master controller sequences transmissions from the RFID readers 200 so that only one RFID reader 200 is transmitting at a time. Besides reducing the potential for interference, this allows the other RFID readers 200 to listen to both the transmitting RFID reader 200 and the subsequent response from the RFID transponders 100. If the RF path between the transmitting RFID reader 200 and the RFID transponder 100 is subject to some form of multipath or signal blockage, it is possible and even highly probable that one of the remaining RFID readers 200 is capable of detecting and interpreting the signal. If the transmitting RFID reader 200 is having trouble receiving an adequate response from a particular RFID transponder 100, the master controller will then poll the remaining RFID readers 200 to determine whether the response was received by any of them.

One major design advantage of the present invention versus all other applications of RFID is the fixed relationship between each RFID reader 200 and the RFID transponders 100. While RFID readers 200 for other applications must include the complexity to deal with many simultaneous tags in the read zone, tags moving rapidly, or tags only briefly in the read zone, the present invention can take advantage of controlled static relationship in the following ways.

While there may be multiple RFID transponders 100 in the read zone of each RFID reader 200, the RFID reader 200 can poll each RFID transponder 100 individually, preventing collisions or interference.

Because the RFID transponders 100 are fixed, the RFID reader 200 can use longer integration times in its signal processing to increase the reliability of the read signal, permitting successful reading at longer distances and lower power when compared with RFID applications with mobile tags.

Furthermore, the RFID readers 200 can make changes in specific frequency while remaining within the specified unlicensed frequency band, in an attempt to find, for each RFID transponder 100, an optimal center frequency, given the manufacturing tolerances of the components in each RFID transponder 100 and any environment effects that may be creating more absorption or reflection at a particular frequency.

Because the multiple RFID readers 200 are controlled from a single master controller, the controller 300 can sequence the RFID readers 200 in time so that the RFID readers 200 do not interfere with each other.

Because there will typically be multiple RFID readers 200 installed in each home, apartment, or other building, the controller 300 can use the excellent spatial diversity created by the distributed nature of the RFID readers 200 to increase and improve the reliability of each read. That is, one RFID reader 200 can initiate the transmission sequence 150, but multiple RFID readers 200 can tune and read the response 151 from the RFID transponder 100.

Because the RFID transponders 100 are static, and because the events (such as intrusion) that affect the status of the sensors connected to RFID transponders 100 are relatively slow compared to the speed of electronics in the RFID readers 200, the RFID readers 200 have the opportunity to pick and choose moments of low quiescent interference from other products in which to perform reads with maximum signal to noise ratio potential—all without missing the events themselves.

Because the path lengths and path loss from each RFID transponder 100 to the RFID reader 200 are relatively static, the RFID reader 200 can use different power levels when communicating with each RFID transponder 100. Lower path losses require lower power to communicate; conversely the RFID reader 200 can step up the power, within the specified limits of the FCC rules, to compensate for higher path losses. The RFID reader 200 can determine the lowest power level to use for each RFID transponder 100 by sequentially stepping down its transmit power 150 on successive reads until no return signal or reflective response 151 can be detected. Then the power level can be increased one or two incremental levels. This determined level can then be used for successive reads. This use of the lowest necessary power level for each RFID transponder 100 can help reduce the possibility of interference while ensuring that each RFID transponder 100 can always be read.

Finally, for the same static relationship reasons, the master controller and RFID readers 200 can determine and store the typical characteristics of transmission between each RFID transponder 100 and each RFID reader 200 (such as signal power, signal to noise ratio, turn on time, modulation bit time, etc.), and determine from any change in the characteristics of transmission whether a potential problem exists. Thus, the RFID reader 200 can immediately detect attempts to tamper with the RFID transponder 100, such as partial or full shielding, deformation, destruction, or removal.

By taking advantage of the foregoing techniques, the RFID reader 200 of the present invention has a demonstrated wireless range of between 10 and 30 meters (approximately a 10 dB field strength range) when communicating with the RFID transponders 100, depending upon the building construction materials, placement of the RFID reader 200 in the room, and the furniture and other materials in the room which may have certain reflective or absorptive properties. This range is more than sufficient for the majority of homes and other buildings in the target market of the present security system, whereby the system can be implemented in a ratio of approximately one RFID reader 200 per major room (i.e., a hallway or foyer is not considered a major room for the purposes of the present discussion, but a living room or bedroom is a major room).

Figure 8B:
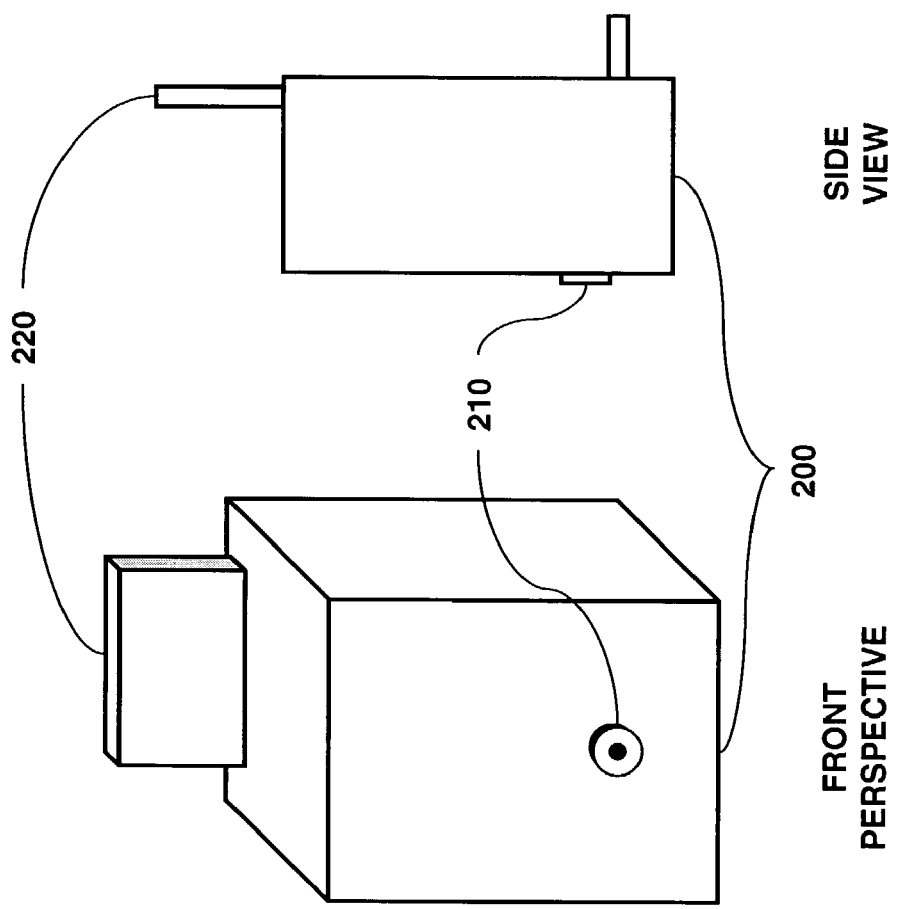
FIG. 8B shows an example embodiment of an RF reader with an acoustic transducer.

The RFID reader 200 is available with several options that increase the level of security in the inventive security system. One option enhances the RFID reader 200 to include an acoustic transducer 210 that adds glass breakage detection capability to the RFID reader 200. Glass breakage sensors have been widely available for years for both wired and wireless prior art security systems. However, they are available only as standalone sensors selling for $40 or more. Of course, in a hardwired system, there is also the additional labor cost of installing separate wires from the alarm panel to the sensor. The cost of the sensors generally limits their use to just a few rooms in a house or other building. The cost, of course, is due to the need for circuits and processors dedicated to just analyzing the sound waves. Since the RFID reader 200 already contains a power supply 207, a processor 203, and a communications mechanism back to the controller 300, the only incremental cost of adding the glass breakage detection capability is the addition of the acoustic transducer 210 (shown in FIGS. 8B and 9). With the addition of this option, glass breakage detection can be available in every room in which an RFID reader 200 has been installed.

Glass breakage detection is performed by analyzing received sound waves to look for the certain sound patterns distinct in the breaking of glass. These include certain high frequency sounds that occur during the impact and breaking of the glass and low frequencies that occur as a result of the glass flexing from the impact. The sound wave analysis can be performed by any number of widely known signal processing techniques that permit the filtering of received signals and determination of signal peaks at various frequencies over time.

One advantage of the present invention over prior art standalone glass breakage sensors is the ability to adjust parameters in the field. Because glass breakage sensors largely rely on the receipt of audio frequencies, they are susceptible to false alarms from anything that generates sounds at the right combination of audio frequencies. Therefore, there is sometimes a requirement that each glass breakage sensor be adjusted after installation to minimize the possibility of false alarms. In some cases, no adjustment is possible because algorithms are permanently stored in firmware at the time of manufacture. Because the glass breakage detection of the present invention is performed by the RFID readers 200, which are all in communication with the controller 300, the controller 300 can alter or adjust parameters used by the RFID reader 200 in glass breakage detection. For example, the controller 300 can contain tables of parameters, each of which applies to different building construction materials or window types. The user can select the appropriate table entry during system configuration, or select another table entry later after experience has been gained with the installed security system. Furthermore, if the controller 300 has a modem module 305 or a wireless module 306, the controller 300 can contact an appropriate database that is, for example, managed by the manufacturer of the security system to obtain updated parameters. There is, therefore, a significant advantage to this implementation of glass breakage detection, both in the cost of device manufacture and in the ability to make adjustments to the processing algorithms used to analyze the sound waves.

The addition of the acoustic transducer 210 to the RFID reader 200 for the glass breakage option also allows the RFID reader 200 to be used by an emergency response agency 374 as a microphone to listen into the activities of an intruder. Rather than analyzing the sound waves, the sound waves can be digitized and sent to the controller 300, and then by the controller 300 to the emergency response agency 374. After the controller 300 has sent an alert message to the emergency response agency 374, an installed modem module 305 or wireless module 306 can be available for use as an audio link, on either a dial-in or dial-out basis.

In a similar manner, the RFID reader 200 can contain optional algorithms for the sensing of motion in the room. Like glass breakage sensors, prior art motion sensors are widely available as standalone devices. Prior art motion sensors suffer from the same disadvantages cited for standalone glass breakage sensors, that is they are standalone devices requiring dedicated processors, circuits, and microwave generators. However, the RFID reader 200 already contains all of hardware components necessary for generating and receiving the radio wave frequencies commonly using in detecting motion; therefore the RFID reader 200 only requires the addition of algorithms to process the signals for motion in addition to performing its reading of the RFID transponders 100. Different algorithms are available for motion detection at microwave frequencies. One such algorithm is Doppler analysis. It is a well known physical phenomenon that objects moving with respect to a transmitter cause a reflection with a shift in the frequency of the reflected wave. While the shift is not large relative to the carrier frequency, it is easily detectable. Therefore, the RFID reader 200 can perform as a Doppler radar by the rapid sending and receiving of radio pulses, with the subsequent measurement of the reflected pulse relative to the transmitted pulse. People and animals walking at normal speeds will typically generate Doppler shifts of 5 Hz to 100 Hz, depending on the speed and direction of movement relative to the RFID reader 200 antenna. The implementation of this algorithm to detect the Doppler shift can be implemented, at the discretion of the designer, with a detection circuit or by performing signal analysis using the processor of the RFID reader 200. In either case, the object of the implementation is to discriminate any change in frequency of the return signal relative to the transmitted signal for the purpose of discerning a Doppler shift. The RFID reader 200 is capable of altering its transmitted power to vary the detection range of this motion detection function.

These motion detection functions can occur simultaneously with the reading of RFID transponders 100. Because the RFID transponders 100 are fixed relative to the RFID readers 200, no unintended shift in frequency will occur in the reflected signal. Therefore, for each transmitted burst to an RFID transponder 100, the RFID reader 200 can analyze the reflected signal for both receipt of data from the RFID transponder 100 as well as unintended shifts in frequency indicating the potential presence of a person or animal in motion.

In summary, the RFID reader 200, in its fullest configuration in a single integrated package is capable of (i) communicating with the controller 300 using power line communications 202 and/or hardwired communications 209, (ii) communicating with RFID transponders 100 using wireless communications, (iii) detecting motion via Doppler analysis at microwave frequencies, (iv) detecting glass breakage via sound wave analysis of acoustic waves received via an audio transducer 210, and (v) providing an audio link to an emergency response agency 374 via an audio transducer 210 and via the controller 300. This RFID reader 200 achieves significant cost savings versus prior art security systems through the avoidance of new wire installation and the sharing of communicating and processing circuitry among the multiple functions. Furthermore, because the RFID readers 200 are under the control of a single master controller, the performance of these functions can be coordinated to minimize interference, and provide spatial diversity and redundant confirmation of received signals.

The motion detector implemented in the RFID reader 200 is only a single detection technology. Historically, single motion detection technologies, whether microwave, ultrasonic, or passive infrared, all suffer false positive indications. For example, a curtain being blown by a heating vent can occasionally be detected by a Doppler analysis motion detector. Therefore, dual technology motion detectors are sometimes used to increase reliability—for example by combining microwave Doppler with passive infrared so that motion by a warm body is required to trigger an alert.

Because the RFID reader 200 will typically be mounted directly on power outlets 230, which are relatively low on the wall in most rooms, incorporating an infrared sensor in the RFID reader 200 is not a viable option. Passive infrared sensors lose their discriminating ability when their line of sight to a warm body is blocked. Because of the low mounting height of the RFID reader 200, it is likely that various pieces of furniture in the room will act to partially or fully block any view that a passive infrared sensor may have of the entire room. In order to overcome this potential limitation, the inventive security system implements a novel technique to implement dual technology motion sensing in a room without the requirement that both technologies be implemented into a single package.

Existing dual technology sensors implement both technologies into single sensors because the sensors are only capable of reporting a "motion" or "no motion" condition to the alarm panel. This is fortunate, because present prior art alarm panels are only capable of receiving a "contact closed" or "contact open" indication. Therefore, all of the responsibility for identifying motion must exist within the single sensor package. The inventive controller 300 can use power line carrier protocols including interface circuits 302 to communicate with the RFID readers 200, and therefore can use the same power line carrier protocol to communicate with a passive infrared sensor 242 mounted separately from the RFID reader 200. Therefore, if in a single room, the RFID reader 200 is detecting motion via microwave Doppler analysis and a passive infrared sensor 242 is detecting the presence of a warm body 350 as shown in FIG. 1, the master controller can interpret the combination of both of these indications in a single room as the likely presence of a person.

Figure 4A:
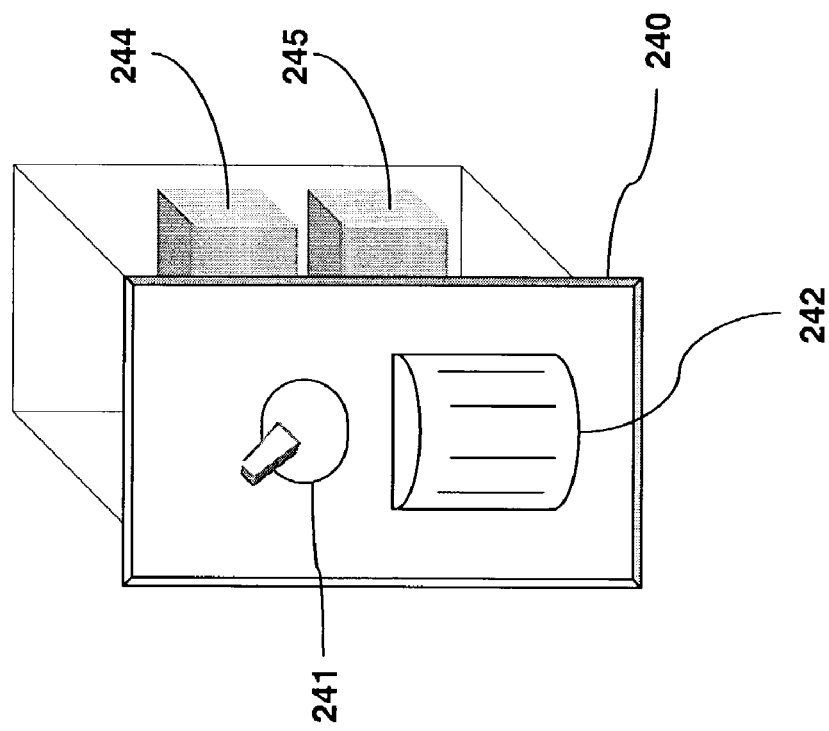
FIG. 4A shows an example embodiment of a passive infrared sensor integrated into a light switch.

One embodiment of this passive infrared sensor 242 is in the form of a light switch 241 with cover 240 as shown in FIG. 4A. Most major rooms have at least one existing light switch, typically mounted at an average height of 55" above the floor. This mounting height is above the majority of furniture in a room, thereby providing a generally clear view of the room. Passive infrared sensors have previously been combined with light switches so as to automatically turn on the light when people are in a room. More importantly, these sensor/switches turn off the lights when everyone has left, thereby saving electricity that would otherwise be wasted by lighting an unoccupied room. Because the primary purpose of these existing devices is to provide local switching, the devices cannot communicate with central controllers such as existing alarm panels.

The passive infrared sensor 242 that operates with the inventive security system includes a local power supply 244 and power line carrier 245 communications that permit the passive infrared sensor 242 to communicate with one or more controllers 300, and be under control of the master controller. At the time of system installation, the master controller is configured by the user thereby identifying the rooms in which the RFID readers 200 are located and the rooms in which the passive infrared sensors 242 are located. The master controller can then associate each passive infrared sensor 242 with one or more RFID readers 200 containing microwave Doppler algorithms. The master controller can then require the simultaneous or near simultaneous detection of motion and a warm body, such as a person 350, before interpreting the indications as a probable person in the room.

Because each of the RFID readers 200 and passive infrared sensors 242 are under control of the master controller, portions of the circuitry in these devices can be shut down and placed into a sleep mode during normal occupation of the building. Since prior art motion sensors are essentially standalone devices, they are always on and are always reporting a "motion" or "no motion" condition to the alarm panel. Obviously, if the alarm panel has been placed into a disarmed state because, for example, the building is being normally occupied, then these "motion" or "no motion" conditions are simply ignored by the alarm panel. But the sensors continue to use power, which although the amount may be small, it is still a waste of AC or battery power. Furthermore, it is well known in the study of reliability of electronic components that "power on" states generate heat in electronic components, and it is heat that contributes to component aging and possible eventual failure.

Additionally, there are some people concerned with being in the presence of microwave radiation. In reality, the amount of radiation generated by these devices is very small, and commonly believed to not be harmful to humans. However, there is the perception among some people that radiation of all types, however small, is still to be avoided. The present security system can selectively shut down or at least slow down the rate of the radiation from the RFID readers 200 when the security system is in a disarmed mode, or if the homeowner or building owner wants the security system to operate in a perimeter only mode without regard to the detection of motion. By shutting down the radiation and transmissions used for motion detection, the security system is conserving power, extending the potential life of the components, and reducing the possibility of interference between the RFID reader 200 and other products that may be operating in the same unlicensed band. This is advantageous because, for example, while people are occupying the building they may be using cordless telephones (or wireless LANs, etc.) and want to avoid possible interference from the RFID reader 200. Conversely, when the security system is armed, there are likely no people in the building, and therefore no use of cordless telephones, and the RFID readers 200 can operate with reduced risk of interference from the transmissions from cordless telephones.

Figure 10:
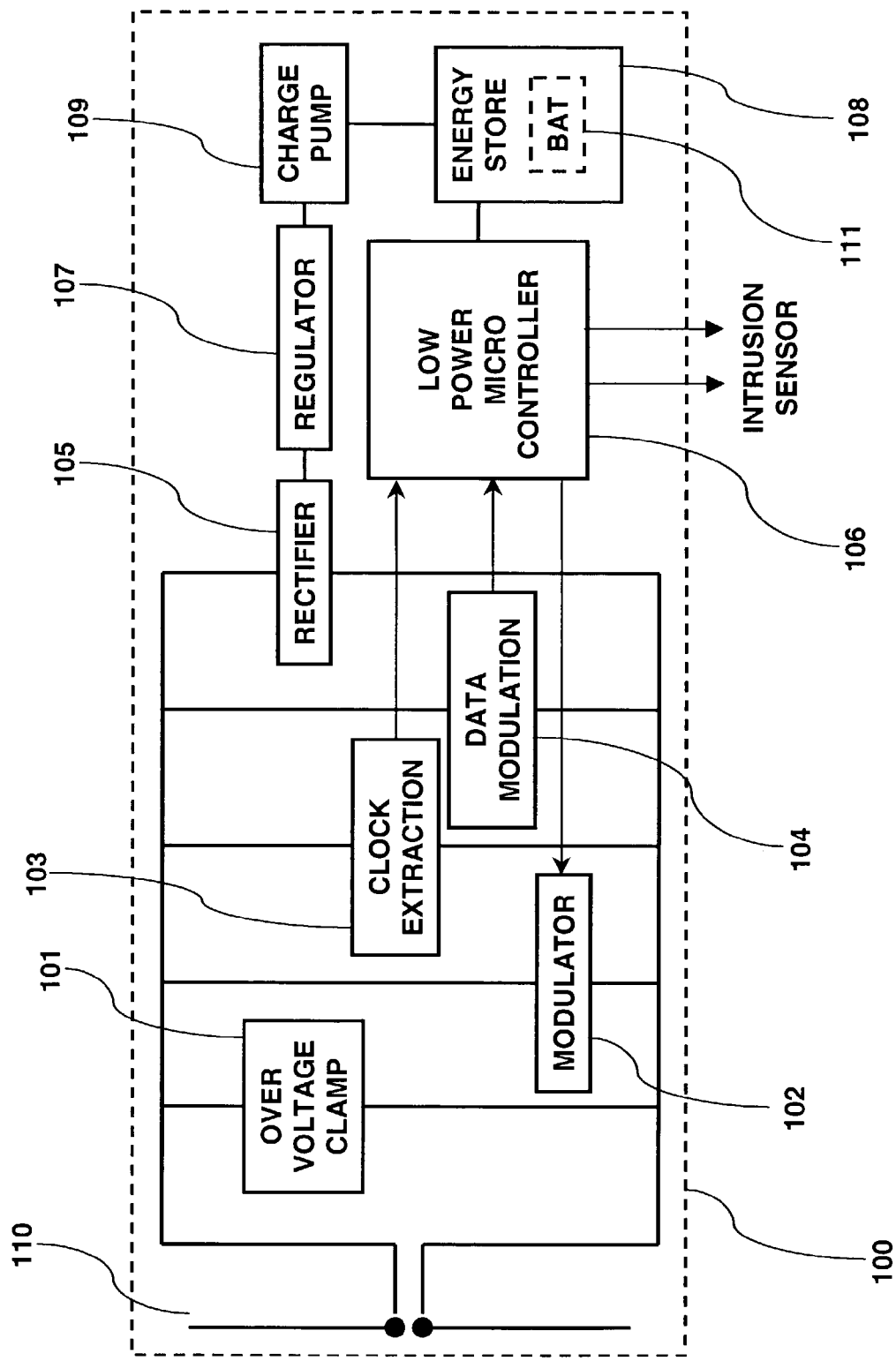
FIG. 10 shows an architecture of the RF transponder.

The RFID transponder 100 of the present invention is shown is FIG. 10. One form may typically be provided with an adhesive backing to enable easy attachment to the frame of an opening such as, for example, a window 353 frame or door 352 frame. RFID transponder 100 designs based upon modulated backscatter are widely known and the details of transponder design are well understood by those skilled in the art. The RFID transponder 100 will typically include energy management circuits such as an overvoltage clamp 101 for protection, a rectifier 105 and regulator 107 to produce proper voltages for use by the charge pump 109 in charging the energy store 108 and powering the microprocessor 106. The RFID transponder 100 receives and interprets commands from the RFID reader 200 by typically including circuits for clock extraction 103 and data modulation 104. Furthermore, the microprocessor 106 can send data and status back to the RFID reader 200 by typically using a modulator 102 to control the impedance of the antenna 110. The impedance control alternately causes the absorption or reflection of the RF energy transmitted by the RFID reader 200 thereby forming the response wireless communications.

Low cost chipsets and related components are available from a large number of manufacturers. In the present invention, the RFID reader 200 to RFID transponder 100 radio link budget is designed to operate at an approximate range of 10 to 30 meters. In a typical installation, each opening will have an RFID transponder 100 installed. The ratio of RFID transponders 100 to each RFID reader 200 will typically be 3 to 6 in an average residential home, although the technology of the present invention has no practical limit on this ratio. The choice of addressing range is a designer's choice largely based on the desire to limit the transmission of wasted bits. In order to increase the security of the transmitted bits, the RFID transponders 100 can include an encryption algorithm. The tradeoff is that this will increase the number of transmitted bits in each message. The key to be used for encryption can be exchanged during enrollment, as explained later.

The RFID transponders 100 are typically based upon a modulated backscatter design. Each RFID transponder 100 in a room absorbs power radiated from one or more RFID readers 200 when the RFID transponder 100 is being addressed, as well as when other RFID transponders 100 are being addressed. In addition, the RFID readers 200 can radiate power for the purpose of providing energy for absorption by the RFID transponders 100 even when the RFID reader 200 is not interrogating any RFID transponders 100. Therefore, unlike most RFID applications in which the RFID transponders or tags are mobile and in the read zone of a prior art RFID reader briefly, the RFID transponders 100 of the present invention are fixed relative to the RFID readers 200 and therefore always in the read zone of at least one RFID reader 200. Therefore, the RFID transponders 100 have extremely long periods of time in which to absorb, integrate, and store transmitted energy.

In a typical day-to-day operation, the RFID reader 200 is making periodic transmissions. The master controller will typically sequence the transmissions from the RFID readers 200 so as to prevent interference between the transmissions of any two RFID readers 200. The master controller will also control the rates and transmission lengths, depending upon various states of the system. For example, if the security system is in a disarmed state during normal occupancy hours, the master controller may use a lower rate of transmissions since little or no monitoring may be required. When the security system is in an armed state, the rate of transmissions may be increased so as to increase the rate of wireless communications between the RFID readers 200 and the various sensors. The increased rate of wireless communications will reduce the latency from any attempted intrusion to the detection of the attempted intrusion. The purpose of the various transmissions will generally fall into several categories including: power transfer without information content, direct addressing of a particular RFID transponder 100, addressing to a predetermined group of RFID transponders 100, general addressing to all RFID transponders 100 within the read range, and radiation for motion detection.

An RFID transponder 100 can typically only send a response wireless communication in reply to a transmission from an RFID reader 200. Furthermore, the RFID transponder 100 will only send a response wireless communication if the RFID transponder 100 has information that it desires to communicate. Therefore, if the RFID reader 200 has made a globally addressed wireless communication to all RFID transponders 100 asking if any RFID transponder 100 has a change in status, an RFID transponder 100 will not respond if in fact it has no change in status to report. This communications architecture reduces the use of resources on multiple levels. On the other hand, if an intrusion sensor 120 detects a probable intrusion attempt, it is desirable to reduce the latency required to report the probable intrusion attempt. Therefore, the communications architecture also includes a mechanism whereby an RFID transponder 100 can cause an interrupt of the otherwise periodic transmissions of any category in order to request a time in which the RFID transponder 100 can provide a response wireless communications with the details of the probable intrusion attempt. The interrupt might be, for example, an extended change of state of the antenna (i.e., from terminate to shorted) or a sequence of bits that otherwise does not occur in normal communications messages. An example sequence may be: (a) the RFID reader 200 may be transmitting power without information content, (b) a first RFID transponder 100 causes an interrupt, (c) the RFID reader 200 detects the interrupt and sends a globally addressed wireless communications, (d) the first RFID transponder 100 sends its response wireless communications. This example sequence may also operate similarly even if in step (a) the RFID reader 200 had been addressing a second RFID transponder 100; steps (b) through (d) may otherwise remain the same.

Because of the passive nature of the RFID transponder 100, the transfer of energy in which to power the RFID transponder 100 relies on the buildup of electrostatic charge across the antenna elements 110 of the RFID transponder 100. As the distance increases between the RFID reader 200 and the RFID transponder 100, the potential voltage that can develop across the antenna elements declines. For example, under 47 CFR 15.245 the RFID reader 200 can transmit up to 75 mW average power. At a distance of 10 m, this transmitted power generates a field of 150 mV/m and at a distance of 30 m, the field declines to 50 mV/m.

The RFID transponder 100 may therefore include a charge pump 109 in which to incrementally add the voltages developed across several capacitors together to produce higher voltages necessary to charge the energy store 108 and/or power the various circuits contained within the RFID transponder 100. Charge pump circuits for boosting voltage are well understood by those skilled in the art. For example, U.S. Pat. No. 5,300,875 and U.S. Pat. No. 6,275,681 contain descriptions of some examples.

One form of the RFID transponder 100 can contain a battery 111, such as a button battery (most familiar use is as a watch battery) or a thin film battery. Batteries of these shapes can be based upon various lithium compounds that provide very long life. For example, Cymbet has developed a thin film battery that is both long life and can be recharged at least 70,000 times. The use of the battery 111 in the RFID transponder 100 does not change the use of the passive modulated backscatter techniques as the communications mechanism. Rather, the battery 111 is used to enhance and assist in the powering of the various circuits in the RFID transponder 100. Therefore, rather than relying solely on a limited energy store 108 such as a capacitor, the RFID transponder 100 can be assured of always having sufficient energy through a longer life battery 111 component. In order to preserve charge in the battery 111, the processor 106 of the RFID transponder 100 can place some of the circuits in the RFID transponder 100 into temporary sleep mode during periods of inactivity.

As mentioned above, the RFID transponder 100 contains a charge pump 109 with which the RFID transponder 100 can build up voltages and stored energy with which to regularly recharge the battery 111, if present. If the battery 111 were to be recharged once per day, a battery capable of being recharged 70,000 times provides a life of over 190 years. This is in stark contrast with the battery powered transmitters used in prior art wireless security systems, which have a typical life of only 1 to 2 years.

In addition to the charge pump 109 for recharging the battery 111, the RFID transponder 100 contains circuits for monitoring the charged state of the battery 111. If the battery 111 is already sufficiently charged, the RFID transponder 100 can signal the RFID reader 200 using one or more bits in a communications message. Likewise, if the battery 111 is less than fully charged, the RFID transponder 100 can signal the RFID reader 200 using one or more bits in a wireless communications message. Using the receipt of these messages regarding the state of the battery 111, if present, in each RFID transponder 100, the RFID reader 200 can take actions to continue with the transmission of radiated power, increase the amount of power radiated (obviously while remaining within prescribed FCC limits), or even suspend the transmission of radiated power if no RFID transponder 100 requires power for battery charging. By suspending unnecessary transmissions, the RFID reader 200 can conserve wasted power and reduce the likelihood of causing unwanted interference.

One form of the RFID transponder 100, excluding those designed to be carried by a person or animal, is typically connected to at least one intrusion sensor 120. From a packaging standpoint, the present invention also includes the ability to combine the intrusion sensors 120 and the RFID transponder 100 into a single package, although this is not a requirement of the invention. The intrusion sensor 120 is used to detect the passage, or attempted passage, of an intruder through an opening in a building, such as window 353 or door 352. In a typical form, the intrusion sensor 120 may simply detect the movement of a portion of a window 353 or door 352. This may be accomplished, for example, by the use of a miniature magnet on the movable portion of the window 353 or door 352, and the use of a magnetically actuated miniature reed switch on a fixed portion of the window 353 or door 352 frame. Other forms are also possible. For example, a pressure sensitive contact may be used whereby the movement of the window 353 or door 352 relieves the pressure on the contact, changing its state. The pressure sensitive contact may be mechanical or electromechanical such as a MEMS device. In any of these cases, the contact of the intrusion sensor 120 is connected to, or incorporated into, the RFID transponder 100 such that the state of "contact closed" or "contact open" can be transmitted by the RFID transponder 100 in a message to the RFID reader 200.

Because the RFID transponder 100 is a powered device (without or without the battery 111, the RFID transponder 100 can receive and store power), and the RFID reader 200 makes radiated power available to any device within its read zone capable of receiving its power, other forms of intrusion sensor 120 design are also available. For example, the intrusion sensor 120 can itself be a circuit capable of limited radiation reflection. Under normally closed circumstances, the close location of this intrusion sensor 120 to the RFID transponder 100 and the simultaneous reflection of RF energy can cause the generation of harmonics detectable by the RFID reader 200. When the intrusion sensor 120 is moved due to the opening of the window 353 or door 352, the gap between the intrusion sensor 120 and the RFID transponder 100 will increase, thereby reducing or ceasing the generation of harmonics. Alternately, the intrusion sensor 120 can contain metal or magnetic components that act to tune the antenna 110 or frequency generating components of the RFID transponder 100 through coupling between the antenna 110 and the metal components, or the switching in/out of capacitors or inductors in the tuning circuit. When the intrusion sensor 120 is closely located next to the RFID transponder 100, one form of tuning is created and detected by the RFID reader 200. When the intrusion sensor 120 is moved due to the opening of the window 353 or door 352, the gap between the intrusion sensor 120 and the RFID transponder 100 will increase, thereby creating a different form of tuning within the RFID transponder 100 which can also be detected by the RFID reader 200. The intrusion sensor 120 can also be an RF receiver, absorbing energy from the RFID reader 200, and building an electrostatic charge upon a capacitor using a charge pump, for example. The increasing electrostatic charge will create an electric field that is small, but detectable by a circuit in the closely located RFID transponder 100. Again, when the intrusion sensor 120 is moved, the gap between the intrusion sensor 120 and the RFID transponder 100 will increase, causing the RFID transponder 100 to no longer detect the electric field created by the intrusion sensor 120.

Another form of intrusion sensor 120 may be implemented with light emitting diode (LED) generators and detectors. Two forms of LED-based intrusion sensor 120 are available. In the first form, shown in FIG. 15A, the LED generator 121 and detector 122 are incorporated into the fixed portion of the intrusion sensor 120 that is typically mounted on the window 353 or door 352 frame. It is immaterial to the present invention whether a designer chooses to implement the LED generator 121 and detector 122 as two separate components or a single component. Then a reflective material, typically in the form of a tape 123 can be attached to the moving portion of the window 353 or door 352. If the LED detector 122 receives an expected reflection from the LED generator 121, then no alarm condition is present. If the LED detector 122 receives a different reflection (such as from the paint of the window rather than the installed reflector) or no reflection from the LED generator 121, then an intrusion is likely being attempted. The reflective tape 123 can have an interference pattern 124 embedded into the material such that the movement of the window 353 or door 352 causes the interference pattern 124 to move past the LED generator 121 and detector 122 that are incorporated into the fixed portion of the intrusion sensor 120. In this case, the movement itself signals that an intrusion is likely being attempted without waiting further for the LED detector 122 to receive a different reflection or no reflection from the LED generator 121. The speed of movement is not critical, as the data encoded into the interference pattern 124 and not the data rates are important. The use of such an interference pattern 124 can prevent easy defeat of the LED-based intrusion sensor 120 by the simple use of tin foil, for example. A different interference pattern 124, incorporating a different code, can be used for each separate window 353 or door 352, whereby the code is stored into the master controller and associated with each particular window 353 or door 352. This further prevents defeat of the LED-based intrusion sensor 120 by the use of another piece of reflective material containing any other interference pattern 124. This use of the LED-based intrusion sensor 120 is made particularly attractive by its connection with an RFID transponder 100 containing a battery 111. The LED generator 121 and detector 122 will, of course, consume energy in their regular use. Since the battery 111 of the RFID transponder 100 can be recharged as discussed elsewhere, this LED-based intrusion sensor 120 receives the same benefit of long life without changing batteries.

Figure 15B:
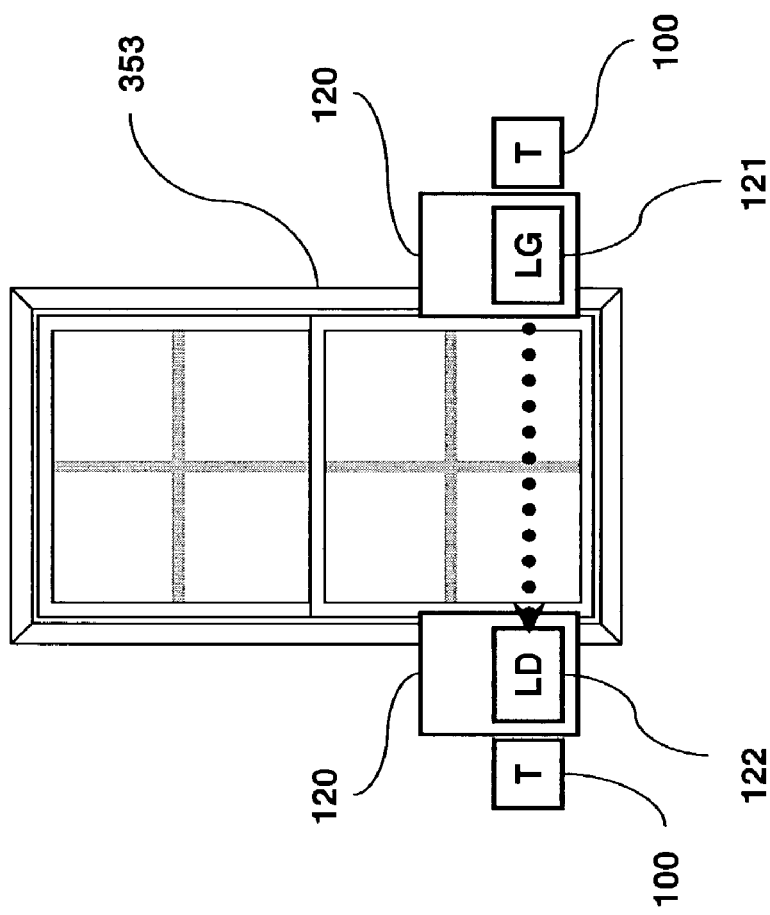
FIGS. 15A and 15B show examples of LED generators and LED detectors that may be used as intrusion sensors.
Figure 15A:
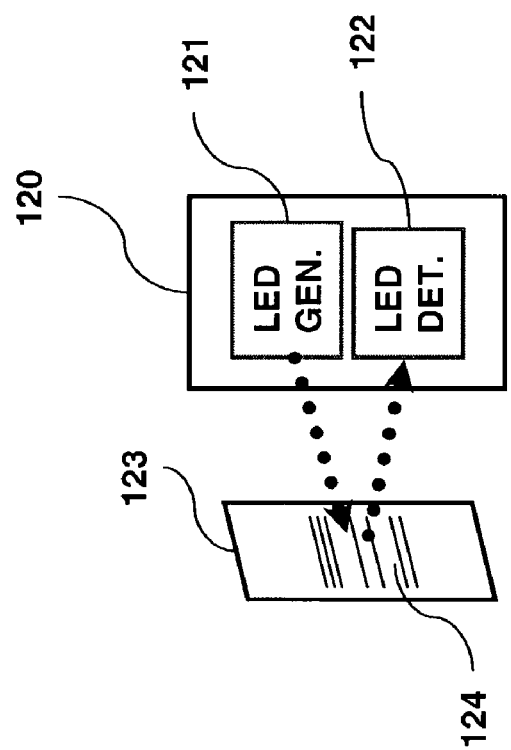

A second form of LED-based intrusion sensor 120 is also available. In this form, the LED generator 121 and LED detector 122 are separated so as to provide a beam of light across an opening as shown in FIG. 15B. This beam of light will typically be invisible to the naked eye such that an intruder cannot easily see the presence of the beam of light. The LED detector 122 will typically be associated with the LED-based intrusion sensor 120, and the LED generator 121 will typically be located across the opening from the LED detector 122. In this form, the purpose of the LED-based intrusion sensor 120 is not to detect the movement of the window 353 or door 352, but rather to detect a breakage of the beam caused by the passage of the intruder through the beam. This form is particularly attractive if a user would like to leave a window 353 open for air, but still have the window 353 protected in case an intruder attempts to enter through the window 353. As before, it would be preferred to modulate the beam generated by the LED generator 121 so as to prevent easy defeat of the LED detector 122 by simply shining a separate light source into the LED detector 122. Each LED generator 121 can be provided with a unique code to use for modulation of the light beam, whereby the code is stored into the master controller and associated with each particular window 353 or door 352. The LED generator 121 can be powered by a replaceable battery or can be attached to an RFID transponder 100 containing a battery 111 so that the LED generator 121 is powered by the battery 111 of the RFID transponder 100, and the battery 111 is recharged as discussed elsewhere. In this latter case, the purpose of the RFID transponder 100 associated with the LED generator 121 would not be to report intrusion, but rather only to act to absorb RF energy provided by the RFID reader 200 and charge the battery 111.

In each of the cases, the RFID transponder 100 is acting with a connected or associated intrusion sensor 120 to provide an indication to the RFID reader 200 that an intrusion has been detected. The indication can be in the form of a message from the RFID transponder 100 to the RFID reader 200, or in the form of changed characteristics of the transmissions from the RFID transponder 100 such that the RFID reader 200 can detect the changes in the characteristics of the transmission. It is impossible to know which form of intrusion sensor 120 will become most popular with users of the inventive security system, and therefore the capability for multiple forms has been incorporated into the invention. Therefore, the inventive nature of the security system and the embodiments disclosed herein are not limited to any single combination of intrusion sensor 120 technique and RFID transponder 100.

Other embodiments of RFID transponders 100 may exist under the present invention. Two other forms of passive infrared sensors 242 can be created by combining a passive infrared sensor 242 with the circuits of the RFID transponder 100. In this manner, the master controller can communicate with the passive infrared sensor 242 without the size, form factor, and cost of the power line communications 245 interface and associated circuits. As shown in FIG. 16A, in one embodiment the passive infrared sensor 242 with its power supply 244 is integrated into the packaging of a light switch 241. Within this same packaging, an RFID transponder 100 is also integrated. The passive infrared sensor 242 operates as before, sensing the presence of a warm body 350. The output of the passive infrared sensor 242 circuits are connected to the RFID transponder 100 whereby the RFID transponder 100 can relay the status of the passive infrared sensor 242 (i.e., presence or no presence of a warm body detected) to the RFID reader 200, and then to the master controller. At the time of system installation, the master controller is configured by the user thereby identifying the rooms in which the RFID readers 200 are located and the rooms in which the passive infrared sensors 242 are located. The master controller can then associate each passive infrared sensor 242 with one or more RFID readers 200 containing microwave Doppler algorithms. The master controller can then require the simultaneous or near simultaneous detection of motion and a warm body 350, such as a person, before interpreting the indications as a probable person in the room.

It is not a requirement that the passive infrared sensor 242 be packaged into a light switch 241 housing. As shown in FIG. 16B, in another embodiment the passive infrared sensor 242 is implemented into a standalone packaging. In this embodiment, both the passive infrared sensor 242 and the RFID transponder 100 are battery 246 powered so that this sensor/transponder combination can be located anywhere within a room. So, for example, this embodiment allows the mounting of this standalone packaging on the ceiling, for a look down on the covered room, or the mounting of this standalone packaging high on a wall.

The present invention also includes a novel method of enrolling RFID transponders 100 with the master controller. The process of enrolling refers to identifying the RFID transponders 100 that are associated with each security system. Each RFID transponder 100 contains a unique serial number to distinguish that RFID transponder 100 from others that may be located in the same building as well as other RFID transponders 100 that may be located in other buildings. The process of enrolling must prevent the unintentional enrollment of RFID transponders 100 that are not intended to be associated with a given security system, without regard to whether the unintentional enrollment would be accidental or malicious. Furthermore, during the process of enrollment, the RFID transponder 100 exchanges more detailed information about itself than would otherwise be transmitted during normal routine transmissions. This more detailed information (for example, the encryption key) allows the RFID transponder 100 and RFID reader 200 to mutually encrypt communications, if necessary, between themselves so that intruders or other interlopers may be prevented from interpreting or spoofing the routine communications between the RFID transponder 100 and RFID reader 200. Spoofing refers to the generation of false communications that attempt to trick a security system into reporting normal conditions when in fact an intrusion is being attempted and the security system would be causing an alert in the absence of the spoofing. Therefore, during enrollment, it would be advantageous to ensure to the greatest degree possible that the more detailed information is not intercepted.

In prior art security systems using transmitters operating under 47 CFR 15.231, the transmitters frequently require programming to associate them with the security system. In some cases, this programming requires the attachment of a special programming console to the transmitter. This is generally not an operation that can be performed by a homeowner. Alternately, the transmitter is identified by a serial number, which then must be manually typed into the keypad. Given the size of the typical keypad and LCD display, and the number of transmitters in a home, this manual process can be quite arduous.

In the present invention, the RFID reader 200 is capable of altering its transmitted power so as to vary the range of its read zone (that is, the distance and shape of the area in which the RFID reader 200 can communicate with an RFID transponder 100). 47 CFR 15.245 permits a maximum average transmit power of 75 milliwatts, but there is no restriction on how low the power can be set. Therefore, using the present invention, when the user desires to enroll with the master controller of a given security system, the following process is followed. The master controller is placed into an enrollment mode. During the enrollment mode, one or more RFID readers 200 are instructed to prepare for enrollment, which entails setting its power level to a low level, thereby creating only a small read zone near to the RFID reader 200. The RFID reader 200 may command all known RFID transponders 100, that is those RFID transponders 100 already enrolled with the master controller, to not respond to the RFID reader 200, thereby allowing the RFID reader 200 to receive responses only from new RFID transponders 100 not already enrolled. The user of the system brings an unenrolled RFID transponder 100 near to the RFID reader 200. Near in this case will typically be within 20 to 30 centimeters of the RFID reader 200. Once the RFID reader 200 can detect the RFID transponder 100, the RFID reader 200 will sequentially step its power down in incremental steps to verify that the RFID transponder 100 is in fact very near to the RFID reader 200. Each incremental step down in power further reduces the size and shape of the read zone. As the power is reduced, all other RFID transponders 100 in the vicinity of the RFID reader 200 should no longer be detectable, and only the RFID transponder 100 being enrolled will be detectable. The RFID reader 200 will reduce its power to a predetermined threshold, at which point the RFID reader 200 can be reasonably certain that the RFID transponder 100 is physically close to the RFID reader 200. At this point of physical closeness and low power, it is highly unlikely that the communications between the two devices can be intercepted. At this point, the RFID transponder 100 provides its unique serial number including the detailed information required for the RFID reader 200 and RFID transponder 100 to engage in encrypted communications. After this particular exchange, the RFID transponder 100 is enrolled, and the master controller may provide audible or visual feedback to the user that the RFID transponder 100 has been enrolled. Now the RFID transponder 100 may be installed.

In a similarly novel manner, RFID readers 200 may be enrolled with the master controller. The same type of issues related in the foregoing apply to the enrollment of RFID readers 200 with the master controller. The installer of the system may first install and power on any number of the controllers and RFID readers 200. Because the RFID reader 200 may employ the same Intellon power line communications chip set as other Ethernet related devices, each RFID reader 200 will typically be assigned at least one unique identity codes, such as a MAC code. This code may be 12 or more alphanumeric digits long, which may be cumbersome to enter via a keypad, especially if the installation involves a large number of RFID readers 200. The automatic method of the present invention proceeds as follows.

The master controller is provided with an associated master key RFID transponder 500. This will typically be in a small form factor that is portable. In a sense, it is like a key for the system. The master controller is placed into an enrollment mode. During the enrollment mode, one or more RFID readers 200 are instructed to prepare for enrollment, which entails setting its power level to a low level, thereby creating only a small read zone near to the RFID reader 200. The user of the system brings the master key RFID transponder 500 near to the RFID reader 200. Near in this case will typically be within 20 to 30 centimeters of the RFID reader 200. Once the RFID reader 200 can detect the master key RFID transponder 500, the RFID reader 200 will sequentially step its power down in incremental steps to verify that the master key RFID transponder 500 is in fact very near to the RFID reader 200. Each incremental step down in power further reduces the size and shape of the read zone. As the power is reduced, all other RFID transponders 100 in the vicinity of the RFID reader 200 should no longer be detectable, and only the master key RFID transponder 500 will be detectable. The RFID reader 200 will reduce its power to a predetermined threshold, at which point the RFID reader 200 can be certain that the master key RFID transponder 500 is physically close to the RFID reader 200. At this point of physical closeness and low power, it is highly unlikely that the communications between the two devices can be intercepted. The master controller commands the RFID reader 200 to read the master key RFID transponder 500, and verifies the content of the master key RFID transponder 500. If the master key RFID transponder 500 is properly verified, the master controller enrolls the RFID reader 200 by receiving its unique identity codes. If desired for higher security, the master key RFID transponder 500 can contain a code used for encrypting communications. This code, once received by the RFID reader 200, can be used to encrypt all communications between the master controller and the RFID reader 200. The code remains secret because it is only transmitted over the short air gap between the RFID reader 200 and the master key RFID transponder 500 during enrollment, and never over the power lines 250, or at high enough power that it is detectable outside of the immediate physical vicinity of the RFID reader 200 or user during enrollment. It is not a requirement that the code is ever user readable or user accessible.

Because the RFID reader 200 and RFID transponder 100 operate in one of the shared frequency bands allocated by the FCC, these devices, as do all Part 15 devices, are required to accept interference from other Part 15 devices. It is primarily the responsibility of the RFID reader 200 to manage communications with the RFID transponder 100, and therefore the following are some of the capabilities that may be included in the RFID reader 200 to mitigate interference. First, the RFID reader 200 can support the use of multiple modulation schemes. The 47 CFR 15.245 rules under which the present invention can operate have a bandwidth of 26 MHz in the 902 to 928 MHz band and 30 MHz in the 2435 to 2465 MHz band, with no restrictions on modulation scheme or duty cycle. The other devices operating in these bands will typically be frequency hopping devices that have divided their allowable spectrum into channels, where each channel may typically be 250 KHz, 500 KHz, 1 MHz, or similar. The specific channels used by other devices may or may not overlap with the spectrum used by the present invention. The most typical case is a partial overlap. For example, the wireless LAN devices known as WiFi follow a standard known as 802.11, which uses the spectrum 2400 to 2483.5 MHz, and employs 75 channels, each with a bandwidth of 1 MHz. These devices only partially overlap the 2435 to 2465 MHz spectrum that may be used by the present invention. All frequency hopping devices operating under 47 CFR 15.247 will typically occupy each of their channels for no more than 400 milliseconds. Therefore, WiFi devices, in this example, have the potential for causing only transitory interference and only for a small proportion of the time (no more than $30/75^{th}$ probability, or 40%).

The RFID reader 200 can vary its modulation scheme, under command of the master controller. The RFID transponder 100 uses backscatter modulation, which alternately reflects or absorbs the signal radiated by the RFID reader 200 in order to send its own data back. Therefore, the RFID transponder 100 will automatically follow, by design, the specific frequency and modulation used by the RFID reader

200. This is a significant advantage versus prior art wireless security system transmitters, which can only transmit at a single modulation scheme with their carrier centered at a single frequency. If interference is encountered at or near that single frequency, these transmitters of prior art wireless security systems have no ability to alter their transmission characteristics to avoid or mitigate the interference.

The RFID reader 200 is capable of at least the following modulation schemes, though the present invention is not limited to just these modulation schemes. As is well known in the art, there are many modulation techniques and variations within any one modulation technique, and designers have great flexibility in making choices in this area. The simplest is a carrier wave (CW) signal, at a variety of frequency choices within the allowable bandwidth. The CW conveys no information from the RFID reader 200 to the RFID transponder, but still allows the RFID transponder 100 to backscatter modulate the signal on the return path. The RFID reader 200 would typically use another modulation scheme such as Binary Phase Shift Keyed (BPSK), Gaussian Minimum Shift Keyed (GMSK), or even on-off AM, when sending data to the RFID transponder, but can use CW when expecting a return signal. The RFID reader 200 can concentrate its transmitted power into this CW, permitting this narrowband signal to overpower a portion of the spread spectrum signal typically used by other devices operating in the unlicensed bands. If the RFID reader 200 is unsuccessful with CW at a particular frequency, the RFID reader 200 can shift frequency within the permitted band. As stated, under the present invention the RFID transponder 100 will automatically follow the shift in frequency by design. Rather than repeatedly generating CW at a single frequency, the RFID reader 200 can also frequency hop according to any prescribed pattern. The pattern may be predetermined or pseudorandom. This pattern can be adaptive and can be varied, as needed to avoid interference.

If the success rate with frequency hopping is, in itself, insufficient to overcome interference, the RFID reader 200 can use a multicarrier modulation scheme, whereby the signal content is now spread into multiple frequencies within a predetermined bandwidth. Since the anticipated interference will likely be coming from frequency hopping devices (based upon the profiles of devices registered in the FCC equipment database for these frequency bands), and only for brief periods of time (less than 400 milliseconds, which is a requirement of most devices operating under 47 CFR 15.247), if the RFID reader 200 spreads its signal out across multiple frequencies in the permitted band then only a portion of the signal will be interfered with at any one point in time. The remaining portion of the signal will likely retain its fidelity. The multicarrier modulation scheme may be spread spectrum or another appropriate scheme. Finally, the RFID reader 200 can combine a multicarrier modulation scheme with frequency hopping so as to both spread its energy within a predetermined channel and also periodically change the channel within the permitted band in which it is operated. There are some devices, such as microwave ovens, which may bleed energy into one of the unlicensed bands. This will typically cause interference in only a region of the band, and will not be moving (as in channel hopping). Therefore the RFID reader 200 can detect repeated failures in the interfered region of the band, and avoid that region for a period of time. The choice of 47 CFR 15.245 as the rule basis permits the RFID reader 200 great flexibility in responding to the environmental conditions experienced in each installation, and at each point in time. Very few other devices have such operating flexibility.

There may be times when the interference experienced by the RFID reader 200 is not unintentional and not coming from another Part 15 device. One mechanism by which a very technically knowledgeable intruder may attempt to defeat the security system of the present invention is by intentional jamming. Jamming is an operation by which a malicious intruder independently generates a set of radio transmissions intended to overpower or confuse legitimate transmissions. In this case, the intruder would likely be trying to prevent one or more RFID transponders 100 from reporting a detected intrusion to the RFID reader 200, and then to the master controller. Jamming is illegal, of course, under the FCC rules; however intrusion itself is also illegal. In all likelihood, a person about to perpetrate a crime may not give any consideration to the FCC rules. Therefore, the RFID reader 200 also contains algorithms that can determine within a reasonable probability that the RFID reader 200 is being subjected to jamming. If one or more RFID readers 200 detect a change in the radio environment, in a relatively short predetermined period of time, wherein attempted changes in modulation schemes, power levels, and other parameters are unable to overcome the interference, the master controller can cause an alert indicating that it is out of communications with one or more RFID transponders 100 with the likely cause being jamming. This condition can be distinguished from the failure of a single RFID transponder 100 by a simultaneous and parallel occurrence of the change in RF environment, caused by signals not following known FCC transmission rules for power, duty cycle, bandwidth, modulation, or other related parameters and characteristics. The alert can allow the building owner or emergency response agency 374 to decide upon an appropriate response to the probable jamming.

In addition to its support of multiple modulation schemes, the RFID reader 200 is available in an embodiment with multiple antennas that enables the RFID reader 200 to subdivide the space into which the RFID reader 200 transmits and/or receives. It is well known in antenna design that it is desirable to control the radiation pattern of antennas to both minimize the reception of noise and maximize the reception of desired signals. An antenna that radiates equally in all directions is termed isotropic. An antenna that limits its radiation into a large donut shape can achieve a gain of 2 dBi. By limiting the radiation to the half of a sphere above a ground place, an antenna can achieve a gain a 3 dBi. By combining the two previous concepts, the gain can be further increased. By expanding upon these simple concepts to create antennas that further limit radiation patterns, various directional gains can be achieved. The RFID reader 200 circuit design permits the construction of embodiments with more than one antenna, whereby the transceiver circuits can be switched from one antenna to another. The RFID reader 200 will typically be plugged into an outlet. Therefore, the necessary coverage zone of the RFID reader 200 is logically bounded by the planes created by the floor below the reader and the wall behind the reader. Therefore, relative to an isotropic antenna, the read zone of the RFID reader 200 should normally be required to cover the space contained within only one-quarter of a sphere. Therefore, a single antenna configured with the RFID reader 200 should typically be designed at a gain of approximately 6 dBi. By comparison, the antennas of most centralized transceivers of prior art wireless security systems are isotropic or have a gain of only 2 to 3 dBi because the wireless transmitters of these prior art systems can be located in any direction from the one centralized transceiver. This design limitation detracts from their receiver sensitivity.

Figure 12B:
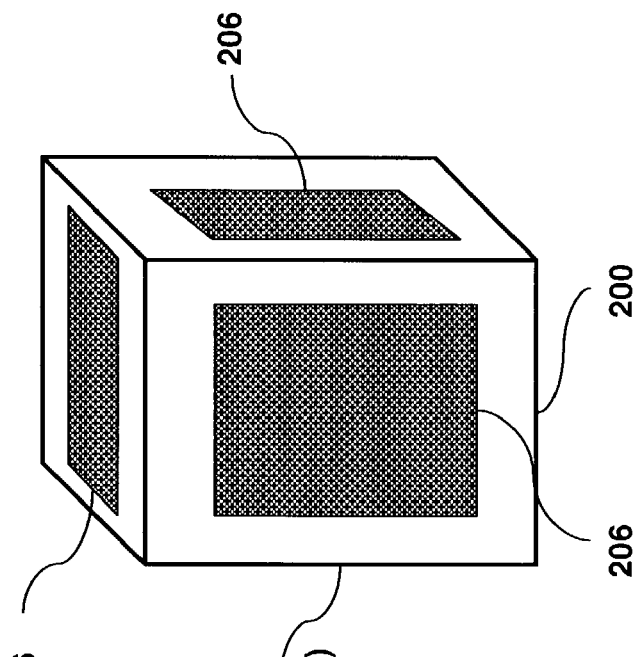
FIGS. 12A and 12B show locations on the RFID reader where patch or microstrip antennas may be mounted so as to provide directivity to the transmissions.
Figure 12A:
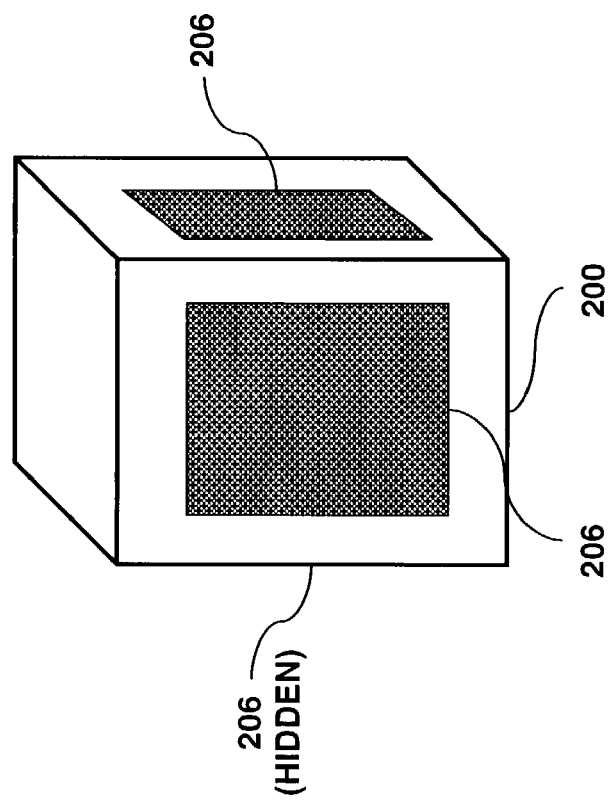

However, it may be desirable to further subdivide this space into multiple subspaces, for example a "left" and a "right" space, with antenna lobes that overlap in the middle. Each antenna lobe may be then able to increase its design gain to approximately 9 dBi or more. Since the RFID readers 200 and RFID transponders 100 are fixed, the RFID reader 200 can "learn" in this example "left"/"right" configuration which RFID transponders 100 have a higher received signal strength in each of the "left" and "right" antennas 206. The simplest method by which this can be achieved is with two separate antennas 206, with the transceiver circuits of the RFID reader 200 switching between the antennas 206 as appropriate for each RFID transponder 100. This enables the RFID reader 200 to increase its receiver sensitivity to the reflected signal returning from each RFID transponder 100 while improving its rejection to interference originating from a particular direction. This example of two antennas 206 can be expanded to three or four antennas 206. Each subdivision of the covered space can allow a designer to design an increase in the gain of the antenna 206 in a particular direction. Because the physical packaging of the RFID reader 200 has physical depth proportionally similar to its width, a three antenna 206 pattern is a logical configuration in which to offer this product, where one antenna 206 looks forward, one looks left, and the other looks right. An alternate configuration, which is equally logical, can employ four antennas 206: one antenna 206 looks forward, the second looks left, the third looks right, and the fourth looks up. These example configurations are demonstrated in FIGS. 12A and 12B.

There are multiple manufacturing techniques available whereby the antennas can be easily printed onto circuit boards or the housing of the RFID reader 200 thereby creating antennas known as patch antennas or microstrip antennas. The reader is directed to *Compact and Broadband Microstrip Antennas*, by Kin-Lu Wong, published by Wiley (2002), as one source for a description of the design and performance of these microstrip antennas. This present specification does not recommend the choice of any one specific antenna design, because so much relies on the designer's preference and resultant manufacturing costs. However, when considering the choice for antenna design for both the RFID reader 200 and the RFID transponder 100, the following should be taken into consideration. Backscatter modulation relies in part upon the Friis transmission equation and the radar range equation. The power Pr that the receiving RFID reader 200 can be expected to receive back from the RFID transponder 100 can be estimated from the power $P_t$ transmitted from the transmitting RFID reader 200, the gain $G_t$ of the transmitting RFID reader 200 antenna, gain Gr of the receiving RFID reader 200 antenna, the wavelength $\lambda$ of the carrier frequency, the radar cross section $\sigma$ of the RFID transponder 100 antenna, and the distances $R_1$ from the transmitting RFID reader 200 to the RFID transponder 100 and $R_2$ from the RFID transponder 100 to the receiving RFID reader 200. (Since more than one RFID reader 200 can receive a wireless communication from the RFID transponder 100, the general case is considered here.) The radar range equation is then:

$$P_r = P_t \cdot \sigma [G_t \cdot G_r / 4\pi] \cdot [\lambda / 4\pi R_1 R_2]^2$$

Therefore, the designer should consider antenna choices for the RFID readers 200 and RFID transponders 100 that maximize, in particular, $G_r$ and $\sigma$. The combination of $P_t$ and $G_t$ cannot result in a field strength that exceeds the prescribed FCC rules. The foregoing discussion of microstrip antennas does not preclude the designer from considering other antenna designs. For example, dipoles, folded dipoles, and log periodic antennas may also be considered. Various patents such as U.S. Pat. No. 6,147,606, U.S. Pat. No. 6,366,260, U.S. Pat. No. 6,388,628, and U.S. Pat. No. 6,400,274, among others, show examples of other antennas that can be considered. Unlike other applications for RFID, the security system of the present invention uses RFID principles in a primarily static relationship. Furthermore, the relationship between the RFID reader 200 antennas and RFID transponder 100 antennas will typically be orthogonal since most buildings and homes have a square or rectangular layout with largely flat walls. This prior knowledge of the generally static orthogonal layout should present an advantage in the design of antennas for this RFID application versus all other RFID applications.

Figure 14:
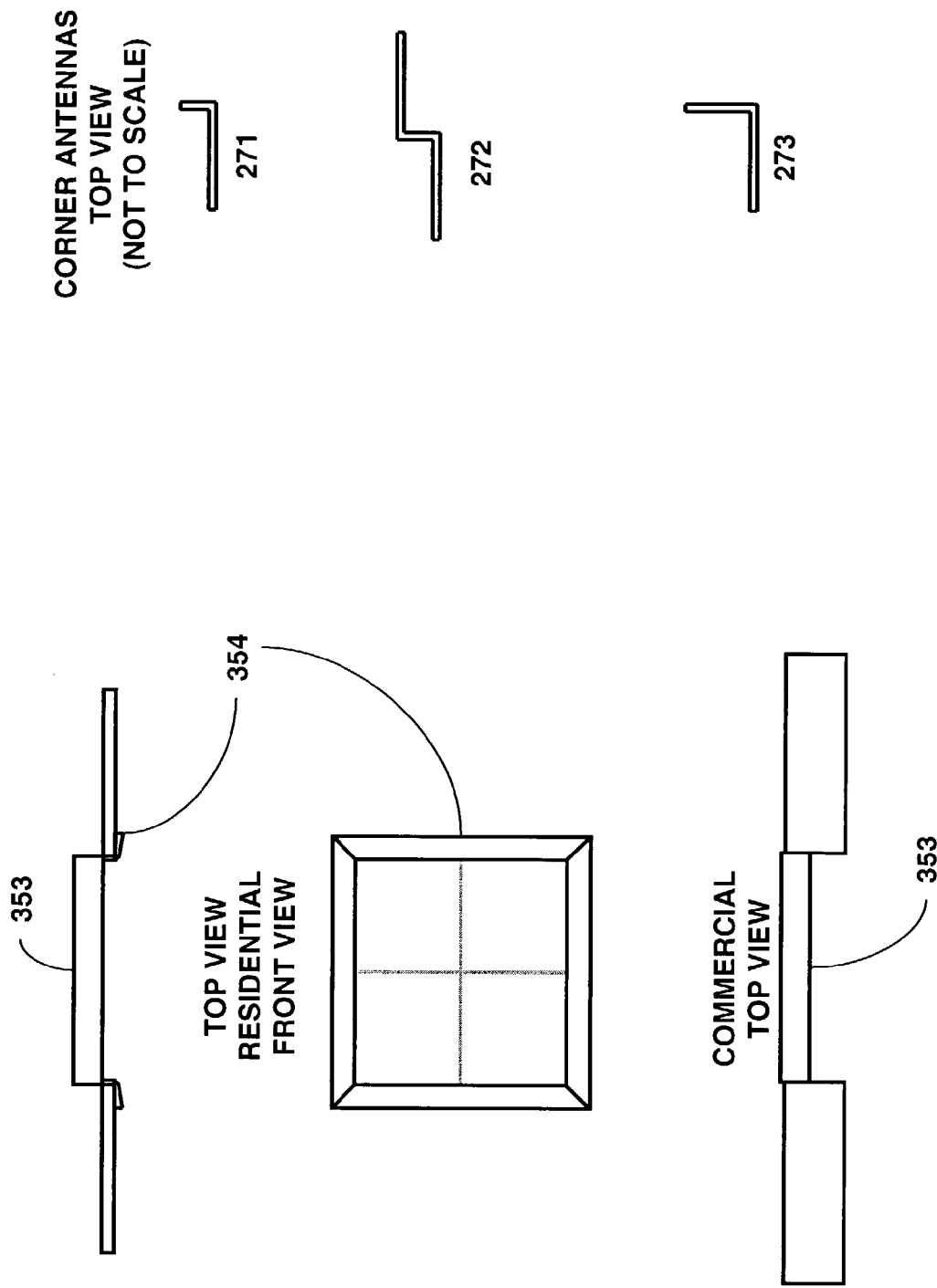
FIG. 14 shows examples of corner antennas for RFID transponders and examples of window frames in which they may be mounted.

Some example antenna designs are shown in FIG. 14. One form of the RFID transponder 100 will typically be used in residential homes. The windows 353 and doors 352 of most residential homes are surrounded by a type of molding known as casing 354. Many shapes of casing 354 are available, but they all share the two important features of width and depth. Typically, the minimum width is 2.25 inches and the minimum depth of the side furthest from the window 353 or door 352 is 0.5 inches. By taking advantage of these known minimum dimensions and the orthogonal layout of most residential homes, wraparound corner antenna designs such as 271 or 272 are possible as shown that provide a reflective surface in two directions and increase the antenna surface area and the radar cross section $\sigma$ of the resultant antenna 206 even when viewed from multiple directions. The corner reflector design for the RFID transponder 100 antenna 271 or 272 increases the layout flexibility of the RFID transponders 100 and the RFID readers 200 in any given room. Many commercial buildings do not use molding around their windows 353, however the wall thickness is frequently much more than the window 353 depth, giving rise to right angle drywall surface as shown in FIG. 14. This is also advantageous for another wraparound corner antenna design such as 273, and in fact provides more flexibility is designing the physical dimensions because commercial building owners are less sensitive about aesthetics than homeowners. The reflective surface of the antenna designs 271–273 can be covered with a plastic housing capable of accepting paint so that the RFID transponder 100 can be painted after installation so as to blend in with the wall decor.

As with several other features of the present invention, designers can make preferred choices on configuration without deducting from the intentions of the present invention, and therefore no limitation should be construed by the choice of any specific number of antennas or type of antenna design.

The architecture of the security system of the present invention provides an advantage to the physical design of antennas for the RFID readers 200. The concepts of directional antenna gain have been applied to various wireless systems, such as cellular systems. However, these systems suffer from the design constraint of multiple sectored antennas simultaneously transmitting. Therefore, in order to achieve the types of gains stated above, these antennas must be designed with large front-to-back signal rejection ratios, for example. The present security system is under command, at all times, of a central master controller, which can sequence the transmissions of each of the RFID readers 200 installed in each system. Therefore, the antenna design parameters are relaxed by knowing that the system is not self-interfering whereby the antenna of one RFID reader 200 must be designed to reject the signals simultaneously generated by another RFID reader 200. This centralized control and the simplified antenna design parameters permit the present system to be manufactured at lower cost.

Figure 17:
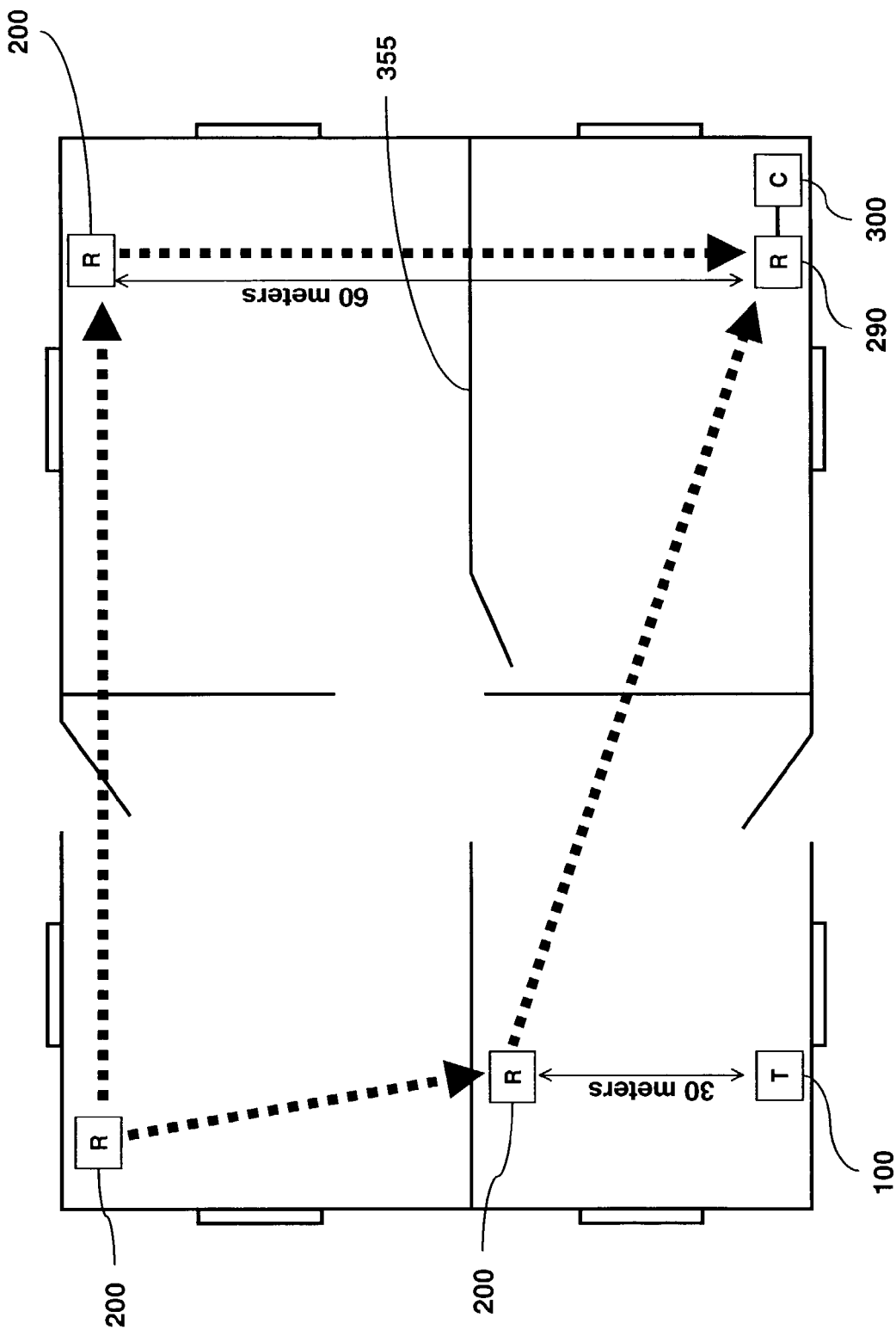
FIG. 17 shows the layout of a house with multiple RFID readers, and the manner in which the RFID readers may form a self-healing net to use wireless communications to reach a controller.

Interference to the present invention can come over the power lines as well. Power line communication is designed to overcome interference through the design of its signal structure. For example, the Intellon power line chip set uses OFDM (orthogonal frequency division multiplexing) modulation to send multiple frequencies in the band 4 to 20 MHz. Many times some of the discrete frequencies will be blocked by interference from hair dryers and other appliance motors. But typically many of the frequencies will not be blocked, resulting in adequate transfer of data. If, however, interference on the power lines is blocking communications, the RFID readers 200 can operate as a self-healing network by switching to RF communications. This is shown in FIG. 17. The transmitting and receiving circuits of the RFID readers 200 are designed to emit enough power to reach the RFID transponders 100, cause the RFID transponders 100 to reflect a portion of the signal (proportional to the radar cross section of the RFID transponder's antenna as shown by the radar range equation earlier), and then detect and receive the reflected signal. The range will typically be designed for 30 meters, with the expected return signal reduced in power by the inverse of the $4^{th}$ power of the distance between RFID reader 200 and RFID transponder 100. Therefore, in any installation in which the RFID readers 200 can communicate with the RFID transponders 100, the RFID readers 200 are also capable of communicating with each other.

For example, consider the layout shown in FIG. 17. One RFID reader 200 is separated from its RFID transponder 100 by 30 meters; two other RFID readers 200 are separated by 60 meters. The reflected signal path from each RFID reader 200 to RFID transponder 100 and back is proportional to $1/(30^4)=1/810000$. The signal path from RFID reader 200 to RFID reader 200 is proportional to $1/(60^2)=1/3600$. Furthermore, the loss through the one wall 355 is generally no more than approximately 10 db, as compared to the loss due to the RFID transponder 100 radar cross section which will typically be greater than 10 dB (25 to 30 dB is not unusual). Therefore, in any scenario in which the system has been installed for normal operation, the RFID readers 200 can compensate for excessive noise on the power lines by maintaining RF communications with each other in place of power line communications.

This allows the RFID reader 200 closest to the controller to act as a gateway RFID reader 290, whereby, if necessary, all of the other RFID readers 200 can use wireless communications to pass messages to and through each other, relaying such messages until they reach the gateway RFID reader 290, who can then pass the messages to the controller. These messages are distinguished from wireless communications directed at the RFID transponders 100 by the header address information, which identifies the source RFID reader 200 as well as the destination of the message. In concept, the RFID readers 200 of this self-healing network are operating similar to the routers of Ethernet networks, whereby the RFID readers 200 pass through and retransmit messages not intended for their use, and originate and terminate messages for their own needs.

As previously mentioned, a controller 300 and RFID reader 200 can communicate using hardwired communications. Therefore, using the present invention, an installation into a building that experiences frequent noisy power lines can install one gateway RFID reader 290 in hardwired communications with the controller, and the remaining RFID readers 200 can operate as a self-healing network and exchange messages by, between, and through each other to reach the gateway RFID reader 290 in hardwired communications with the controller.

The range of the present security system can be extended, if necessary in certain installations, in the following manner. FCC rule section 47 CFR 15.249 permits the construction of transmitters in the bands 902 to 928 MHz and 2400 to 2483.5 MHz with a field strength of 50 mV/m at 3 meters (equivalent to approximately 750 microwatts). Unlike the RFID transponders 100, transmitters under this rule section must now be active transmitters 190. These active transmitters 190 require more components, and therefore will be more expensive to manufacture than the RFID transponders 100. They will also likely suffer from some of the same disadvantages of the transmitters of prior art wireless security systems such as reduced battery life, with the following exceptions. 47 CFR 15.249 does not have the duty cycle restrictions of 47 CFR 15.231. The field strength limits of 47 CFR 15.249 are greater than the field strength limits of 47 CFR 15.231. Finally, the present security system is not based around a single central transceiver; distributed RFID readers 200 are still used with all of the aforementioned advantages. If the building owner has one area too large in which to operate using the lower cost RFID transponders 100, transmitters 190 may be used in place of the RFID transponders 100. In the manner previously discussed, the transmitters 190 will now be connected to an intrusion sensor 120. A single RFID reader 200 can communicate with both RFID transponders 100 and transmitters 190, and the RFID reader 200 remains in control of communications with both the RFID transponders 100 and transmitters 190 to avoid system self-interference and collisions.

The RFID reader 200 is not limited to reading just the RFID transponders 100 installed in the openings of the building. The RFID reader 200 can also read RFID transponders 100 that may be carried by warm bodies 350 such as individuals or animals 351, or placed on objects of high value. By placing an RFID transponder 100 on an animal 351, for example, the controller 300 can optionally ignore indications received from the motion sensors if the animal 351 is in the room where the motion was detected. By placing an RFID transponder 100 on a child, the controller 300 can use the wireless module 306, if installed, to send an SMS-based message to a parent at work when the child has arrived home or equally important, if the child was home and then leaves the home. The RFID transponder 100 can also include a button than can be used, for example, by an elderly or invalid person to call for help in the event of a medical emergency or other panic condition. When used with a button, the RFID transponder 100 is capable of reporting two states: one state where the RFID transponder 100 simply registers its presence, and the second state in which the RFID transponder 100 communicates the "button pressed" state. It can be a choice of the system user of how to interpret the pressing of the button, such as causing an alert, sending a message to a relative, or calling for medical help. Because the RFID readers 200 will typically be distributed throughout a house, this form of panic button can provide a more reliable radio link than prior art systems with only a single centralized receiver.

Earlier, the X-10 power line protocol was mentioned and then dismissed as a contender for use in the power line communications of the disclosed invention. The X-10 protocol is far too simple and lacking in reliability features for use in a security system. However, there are reportedly over 100 million lighting and appliance control devices that have shipped with the X-10 protocol. These devices are typically used only to turn on, turn off, or variably dim lights or appliances. Because the controller 300 is already coupled to the power lines 250, the controller 300 is also capable of generating the 120 KHz pulses necessary to send X-10 based commands to X-10 devices that may be installed in the building or home. The controller 300 can be configured, for example, to turn on certain lights when an intrusion has been detected and when the system has been disarmed. The support for this protocol is only as a convenience for these legacy devices.

Finally, the security system also includes an optional legacy interface module 400 shown in FIG. 2. This interface module 400 can be used by building owners or homeowners that already have certain parts of a prior art wired security system installed, and would like to continue to use these parts in conjunction with the inventive security system disclosed herein. Older wired security systems operate on the contact "closed" or "open" principle. That is, each sensor, whether magnetic/reed switch window/door contact, motion sensor, glass breakage sensor, heat sensor, etc., is in one state (generally contact "closed") when normal, and then is in the other state (generally contact "open") when in the detection state (i.e., intrusion, motion, heat, etc.). The interface module 400 allows these legacy devices to be monitored by the controller 300. The interface module 400 provides power line communications 401 to the controller 300, terminal interfaces 404 for the wires associated with the sensors, DC power 402 to powered devices, and battery 403 backup in the case of loss of primary power. The controller 300 must be configured by the user to interpret the inputs from these legacy devices. The interface module 400 also implements the bus protocol supported by the legacy keypads 410 currently used with prior art wired security systems. This bus protocol is separate from the contact "closed" or "open" interfaces described in the foregoing; it is typically a 4-wire interface whereby commands and responses can be modulated onto the wires. Because of the large numbers of these keypads 410 installed into the marketplace, there is a high degree of familiarity in the home security user base for the form factor and function of these keypads 410. One example of such a keypad 410 supported by the interface module 400 is shown in design patent D389,762, issued Jan. 27, 1998 to Yorkey, and assigned to Brinks Home Security.

The true scope of the present invention is not limited to the presently preferred embodiments disclosed herein. As will be understood by those skilled in the art, for example, different components, such as processors or chipsets, can be chosen in the design, packaging, and manufacture of the various elements of the present invention. The discussed embodiments of the present invention have generally relied on the availability of commercial chipsets, however many of the functions disclosed herein can also be implemented by a designer using discrete circuits and components. As a further example, the RFID reader 200 and RFID transponder 100 can operate at different frequencies than those discussed herein, or the controller 300 and RFID readers 200 can use alternate power line communications protocols. Also, certain functions which have been discussed as optional may be incorporated as part of the standard product offering if customer purchase patterns dictate certain preferred forms. Finally, this document generally references U.S. standards, customs, and FCC rules. Various parameters, such as input power or output power for example, can be adjusted to conform with international standards. Accordingly, except as they may be expressly so limited, the scope of protection of the following claims is not intended to be limited to the specific embodiments described above.

I claim:

1. A method for controlling the communications in a security system containing at least a first controller, at least a first RFID reader, at least a first intrusion sensor, and at least a first RFID transponder associated with the first intrusion sensor, the method comprising the steps of:
   detecting through the intrusion sensor an emergency occurrence of intrusion into a structure monitored by the security system;
   prompting the first RFID transponder to transmit to the first RFID reader an interrupt advising the first RFID reader that the intrusion sensor has detected an emergency occurrence of intrusion; and
   otherwise sending a wireless communication from the first RFID transponder to the first RFID reader only in response to a wireless communication from the first RFID reader.

2. The method of claim 1, wherein the first RFID reader only sends a wireless communications in response to a command from the first controller.

3. The method of claim 1, wherein the security system contains a second RFID reader, further comprising the step of sending from the first RFID reader sends a wireless communications to the first RFID transponder, and both the first and second RFID readers receive the response wireless communications from the RFID transponder.

4. The method of claim 3, wherein the first controller processes only valid messages contained in any response wireless communications from the RFID transponder received at either of the first and second RFID readers.

5. The method of claim 1, wherein the first RFID reader interprets the response wireless communications from the RFID transponder for the presence of interference.

6. The method of claim 5, wherein the first RFID reader further interprets the response wireless communications from the RFID transponder for the presence of a jamming signal.

7. The method of claim 1, wherein the first controller determines the radio frequency at which the first RFID reader shall center the carrier of its wireless communications.

8. The method of claim 1, wherein the first controller determines the modulation technique which the first RFID reader shall use for its wireless communications.

9. The method of claim 7, wherein the first controller determines the radio frequency at which the first RFID reader shall center the carrier of its wireless communications by selecting from a predetermined list of available radio frequencies.

10. The method of claim 8, wherein the first controller determines the modulation technique which the first RFID reader shall use for its wireless communications by selecting from a predetermined list of available modulation techniques.

11. The method of claim 7, wherein the criteria for selecting the radio frequency includes the identity of the RFID transponder to which the wireless communications is directed.

12. The method of claim 8, wherein the criteria for selecting the modulation technique includes the identity of the RFID transponder to which the wireless communications is directed.

13. The method of claim 7, wherein the criteria for selecting the radio frequency includes whether interference is present.

14. The method of claim 8, wherein the criteria for selecting the modulation technique includes whether interference is present.

15. The method of claim 1, wherein the first RFID reader contains more than one antenna with which to communicate, and the first controller determines the antenna that the first RFID reader shall use for its wireless communications.

16. The method of claim 15, wherein the criteria for selecting the antenna includes the identity of the RFID transponder to which the wireless communications is directed.

17. The method of claim 15, wherein the criteria for selecting the antenna includes whether interference is present.

18. The method of claim 1, wherein the first RFID reader can adjust its transmit power level within a predetermined range, and the first controller determines the transmit power level that the first RFID reader shall use for its wireless communication.

19. The method of claim 18, wherein the criteria for selecting the transmit power level includes the identity of the RFID transponder to which the wireless communications is directed.

20. The method of claim 18, wherein the criteria for selecting the transmit power level includes whether interference is present.

21. A security system for use in a building to be monitored for intrusion, the security system comprising:
    at least a first intrusion sensor detecting the occurrence of intrusion into the building monitored by the security system;
    at least a first RFID transponder associated with the first intrusion sensor;
    at least a first RFID reader in wireless communications with the first RFID transponder; and
    at least a first controller in communication with the first RFID reader,
    wherein the first RFID transponder transmits to the first RFID reader an interrupt advising the first RFID reader that the intrusion sensor has detected an intrusion and the first RFID transponder otherwise returns a wireless communications to the first RFID reader only in response to a wireless communications from the first RFID reader.

22. The security system of claim 21, wherein the first RFID reader only sends a wireless communications in response to a command from the first controller.

23. The security system of claim 21, wherein the first RFID reader can send its wireless communications with its carrier centered at more than one radio frequency.

24. The security system of claim 21, wherein the first RFID reader can send its wireless communications using more than one modulation technique.

25. The security system of claim 21, wherein the first RFID reader can send its wireless communications using more than one antenna.

26. The security system of claim 21, wherein the first RFID reader can send its wireless communications using more than one power level.

27. The security system of claim 23, wherein the first controller determines the radio frequency at which the first RFID reader shall center the carrier of its wireless communications.

28. The security system of claim 23, wherein the criteria for selecting the radio frequency includes the identity of the RFID transponder to which the wireless communications is directed.

29. The security system of claim 24, wherein the first controller determines the modulation technique which the first RFID reader shall use for its wireless communications.

30. The security system of claim 24, wherein the criteria for selecting the modulation technique includes the identity of the RFID transponder to which the wireless communications is directed.

31. The security system of claim 25, wherein the first controller determines the antenna that the first RFID reader shall use for its wireless communications.

32. The security system of claim 25, wherein the criteria for selecting the antenna includes the identity of the RFID transponder to which the wireless communications is directed.

33. The security system of claim 26, wherein the first controller determines the transmit power level that the first RFID reader shall use for its wireless communications.

34. The security system of claim 26, wherein the criteria for selecting the transmit power level includes the identity of the RFID transponder to which the wireless communications is directed.

35. The security system of claim 21, wherein the first RFID reader can determine whether interference is present in the wireless communications returned from the first RFID transponder.

36. The security system of claim 21, wherein the first RFID reader can determine whether jamming is present in the wireless communications returned from the first RFID transponder.

37. A security system for use in a building to be monitored for intrusion, the building having a number of rooms each with one or more openings, the security system comprising:
    an intrusion sensor being located proximate each opening to be monitored and detecting the occurrence of intrusion through that opening;
    an RFID transponder associated with each intrusion sensor;
    multiple RFID readers distributed in at least some of the rooms, each RFID reader in wireless communication with one or more RFID transponders and providing overlapping read zones defined as areas in which an RFID reader can communicate with an RFID transponder;
    at least one controller communicating with each RFID reader and identifying, enrolling, and controlling each RFID transponder and RFID reader of the security system.

38. The security system of claim 37 wherein at least one of the RFID readers has a glass breakage, heat, smoke, contact, or motion sensor.

39. The security system of claim 38 wherein the controller adjusts the parameters of the glass breakage, heat, smoke, contact, or motion sensor.

40. The security system of claim 37 wherein the controller commands the RFID readers to use a particular combination of radio frequency, modulation technique, antenna, and power level to communicate with a particular RFID transponder.

41. The security system of claim 37 wherein the controller, upon receipt of a particular communication from an RFID reader, sends an alert to an emergency response agency.

42. The security system of claim 37 wherein at least one RFID reader operates as a field disturbance sensor.

43. The security system of claim 37 wherein each RFID reader wirelessly communicates with one or more RFID transponders using modulated backscatter techniques.

44. The security system of claim 37 wherein the controller sequences the RFID readers so that only one RFID reader communicates with the controller at a time.

45. The security system of claim 37 wherein the RFID readers and the one or more RFID transponders are in a fixed physical configuration.

46. The security system of claim 37 wherein the ratio of RFID readers to major rooms in the building is approximately one-to-one.

47. The security system of claim 37 wherein at least one of the RFID readers varies the range of its read zone.

* * * * *